US007525975B2

(12) United States Patent
Caspi et al.

(10) Patent No.: US 7,525,975 B2
(45) Date of Patent: Apr. 28, 2009

(54) SYSTEM AND METHOD FOR INTEGRATED AUDIO STREAM MANAGER

(76) Inventors: Rami Caspi, 813 Flin Way, Sunnyvale, CA (US) 94087; William J. Beyda, 21580 Edward Way, Sunnyvale, CA (US) 95014

( * ) Notice: Subject to any disclaimer, the term of this patent is extended or adjusted under 35 U.S.C. 154(b) by 1038 days.

(21) Appl. No.: 10/383,895

(22) Filed: Mar. 7, 2003

(65) Prior Publication Data

US 2004/0174858 A1    Sep. 9, 2004

(51) Int. Cl.
H04L 12/28    (2006.01)
H04L 12/56    (2006.01)

(52) U.S. Cl. .................. 370/401; 709/231; 725/81; 725/82; 725/83; 725/141; 386/46; 386/125; 370/338; 370/352; 370/466

(58) Field of Classification Search .......... 709/231, 709/232; 207/104; 370/468, 389, 401, 465, 370/352–356, 466, 486, 338, 463; 725/82, 725/81, 83, 79, 58, 112, 113, 141; 348/85; 386/46, 125

See application file for complete search history.

(56) References Cited

U.S. PATENT DOCUMENTS

| 6,008,777 | A | 12/1999 | Yiu |
| 6,150,599 | A * | 11/2000 | Fay et al. .................. 84/609 |
| 6,195,501 | B1 | 2/2001 | Perry et al. |
| 6,233,389 | B1 | 5/2001 | Barton et al. |
| 6,310,886 | B1 | 10/2001 | Barton |
| 6,347,406 | B1 | 2/2002 | Jones et al. |
| 6,430,185 | B1 | 8/2002 | Kerns et al. |
| 6,442,328 | B1 | 8/2002 | Elliott et al. |
| 6,442,599 | B1 | 8/2002 | DuLac et al. |
| 6,446,080 | B1 * | 9/2002 | Van Ryzin et al. ........ 707/104.1 |
| 6,526,581 | B1 | 2/2003 | Edson |
| 6,728,820 | B1 | 4/2004 | Hilt |
| 6,748,481 | B1 | 6/2004 | Parry et al. |
| 6,775,461 | B2 | 8/2004 | Poslinski et al. |
| 6,912,691 | B1 | 6/2005 | Dodrill et al. |
| 6,925,567 | B1 | 8/2005 | Hirata |
| 7,000,246 | B1 | 2/2006 | Takao |

(Continued)

FOREIGN PATENT DOCUMENTS

DE        199 04 544        8/2000

(Continued)

OTHER PUBLICATIONS

Reitter, et al., "Controlling and Checking Devices via the Session Initiation Protocol—a Service for the IM Subsystem," Telcordia Research, Jul. 2001, p. 196, vol. 4, No. 12, XP007002630.

(Continued)

*Primary Examiner*—Ajit Patel

(57) ABSTRACT

A multimedia telecommunications system including an integrated audio stream manager (102) in association with the digital personal video stream manager. Such an integrated audio stream manager employs a personal computer (110) to record and store audio such as compact disk tracks. The personal computer (10) can then contact one or more Internet web sites for CD indices to download a list of the tracks and provide a master list of all CDs stored. The digital personal video stream manager (102) can then be used to supervise playback of the audio files via the connected audio system.

12 Claims, 20 Drawing Sheets

U.S. PATENT DOCUMENTS

| | | |
|---|---|---|
| 7,010,500 B2 | 3/2006 | Aarnio |
| 7,095,402 B2 | 8/2006 | Kunii et al. |
| 7,111,320 B1 | 9/2006 | Novak |
| 7,113,999 B2 * | 9/2006 | Pestoni et al. ............... 709/231 |
| 7,124,195 B2 * | 10/2006 | Roach et al. ............... 709/232 |
| 7,127,491 B2 | 10/2006 | Zirnstein, Jr. |
| 7,130,315 B1 | 10/2006 | Brelin |
| 7,243,131 B1 | 7/2007 | Inoue |
| 2001/0005906 A1 | 6/2001 | Humpleman |
| 2001/0021998 A1 | 9/2001 | Margulis |
| 2001/0046366 A1 | 11/2001 | Susskind |
| 2002/0002627 A1 | 1/2002 | Stead et al. |
| 2002/0031120 A1 | 3/2002 | Rakib |
| 2002/0044225 A1 | 4/2002 | Rakib |
| 2002/0046404 A1 | 4/2002 | Mizutani |
| 2002/0046407 A1 | 4/2002 | Franco |
| 2002/0054601 A1 | 5/2002 | Barraclough et al. |
| 2002/0059574 A1 | 5/2002 | Tudor et al. |
| 2002/0059637 A1 | 5/2002 | Rakib |
| 2002/0069419 A1 | 6/2002 | Raverdy et al. |
| 2002/0162112 A1 | 10/2002 | Javed |
| 2002/0165000 A1 | 11/2002 | Fok |
| 2003/0036395 A1 | 2/2003 | Proidl |
| 2003/0126612 A1 | 7/2003 | Ikeda et al. |
| 2003/0151618 A1 * | 8/2003 | Johnson et al. ............. 345/716 |
| 2003/0188320 A1 | 10/2003 | Shing |
| 2003/0226143 A1 | 12/2003 | Michael et al. |
| 2004/0019489 A1 | 1/2004 | Funk et al. |
| 2004/0064445 A1 | 4/2004 | Pfleging et al. |
| 2004/0163130 A1 | 8/2004 | Gray et al. |
| 2004/0268407 A1 | 12/2004 | Sparrell et al. |
| 2005/0028208 A1 | 2/2005 | Ellis |
| 2007/0067810 A1 | 3/2007 | Durden |

FOREIGN PATENT DOCUMENTS

| | | |
|---|---|---|
| DE | 199 50 576 | 5/2001 |
| EP | 1 058 428 | 12/2000 |
| EP | 1 161 092 A2 | 12/2001 |
| EP | 1 182 819 | 2/2002 |
| EP | 1 185 030 | 3/2002 |
| JP | 2002082888 | 3/2002 |
| JP | 2003116182 | 4/2003 |
| WO | WO 01/25892 | 4/2001 |
| WO | WO 01/78381 | 10/2001 |
| WO | WO 02/01781 | 1/2002 |
| WO | WO 02/21841 | 3/2002 |
| WO | WO 03/21837 | 3/2002 |
| WO | WO 02/054773 | 7/2002 |
| WO | WO 03/017700 A2 | 2/2003 |

OTHER PUBLICATIONS

Bull, et al., "Residential Gateways," BT Technology Journal, Apr. 2002, pp. 73-81, vol. 20, No. 2, XP001123206.

* cited by examiner

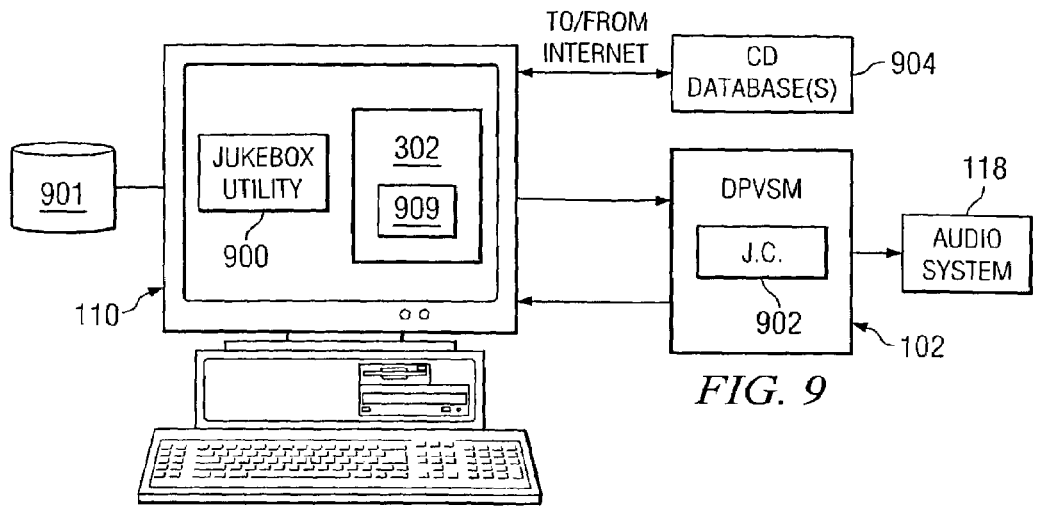
FIG. 9
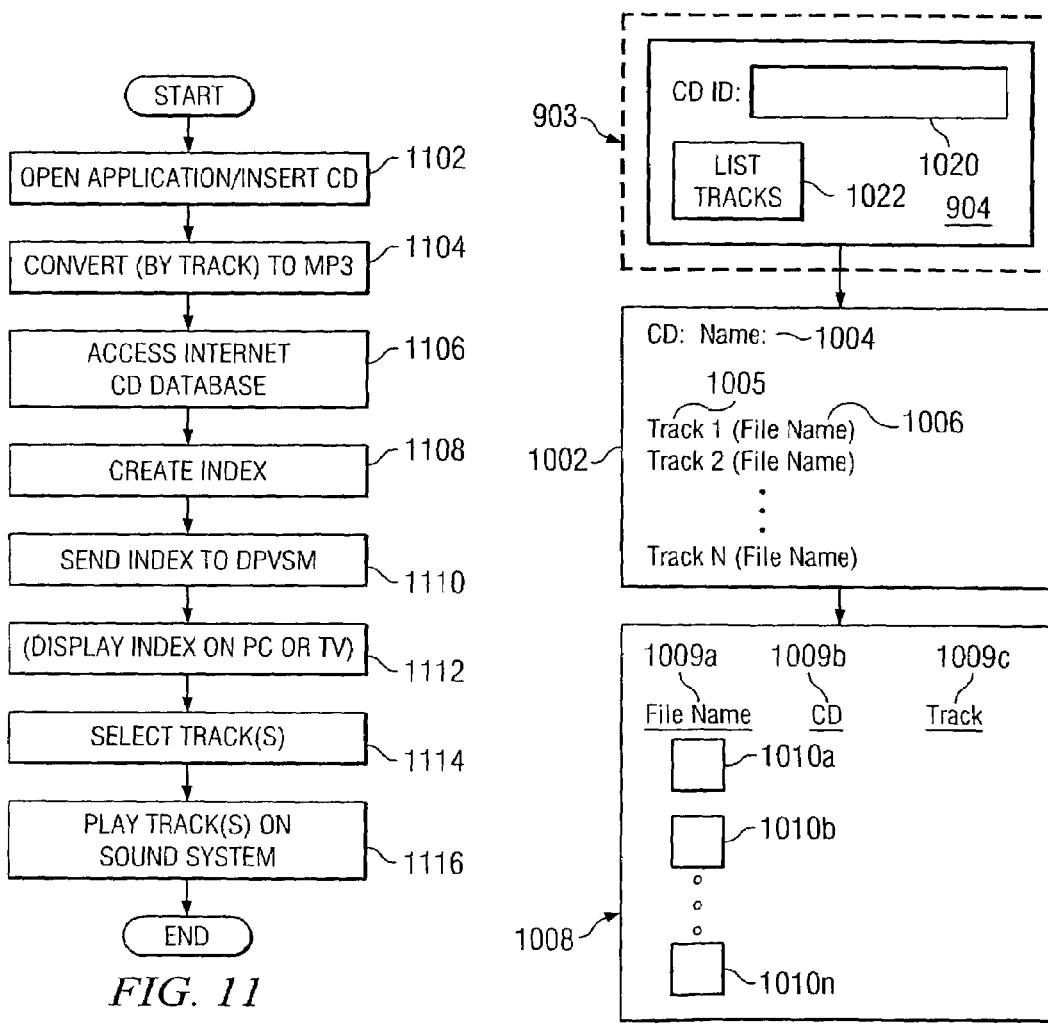
FIG. 11
FIG. 10

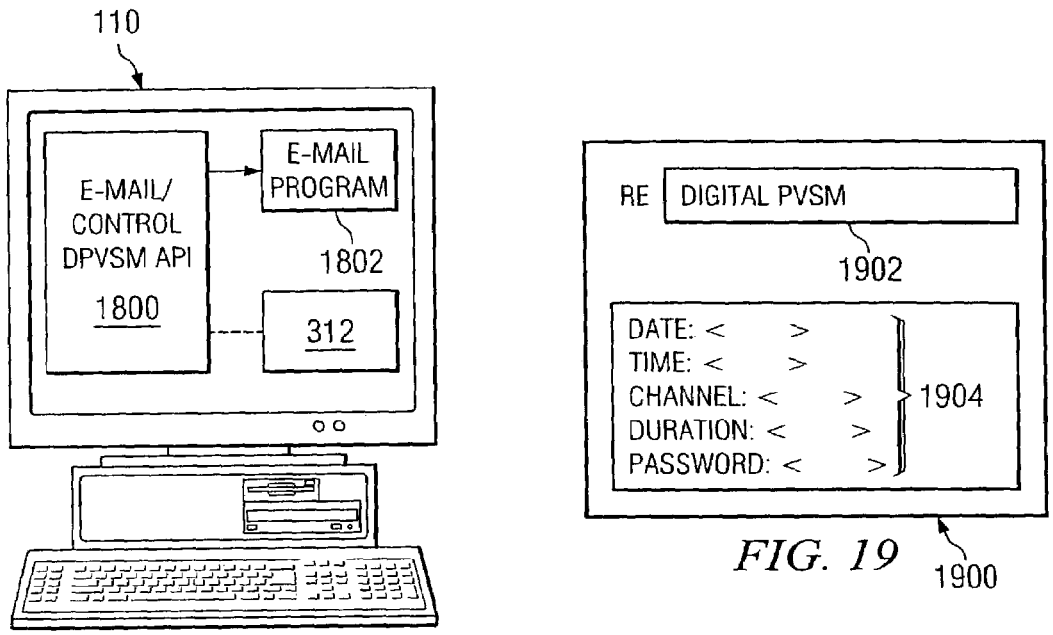
FIG. 18
FIG. 19
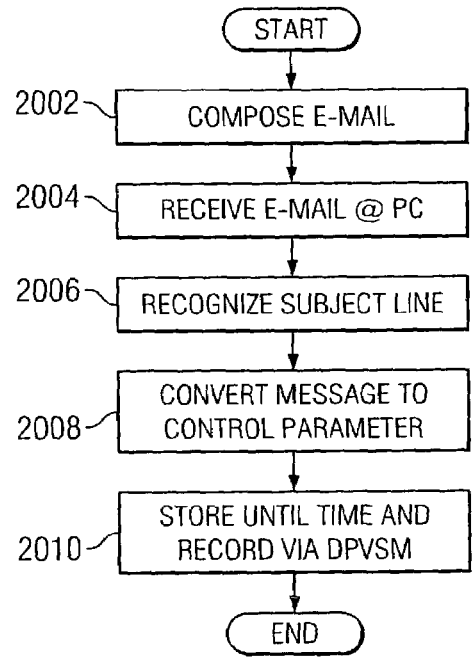
FIG. 20

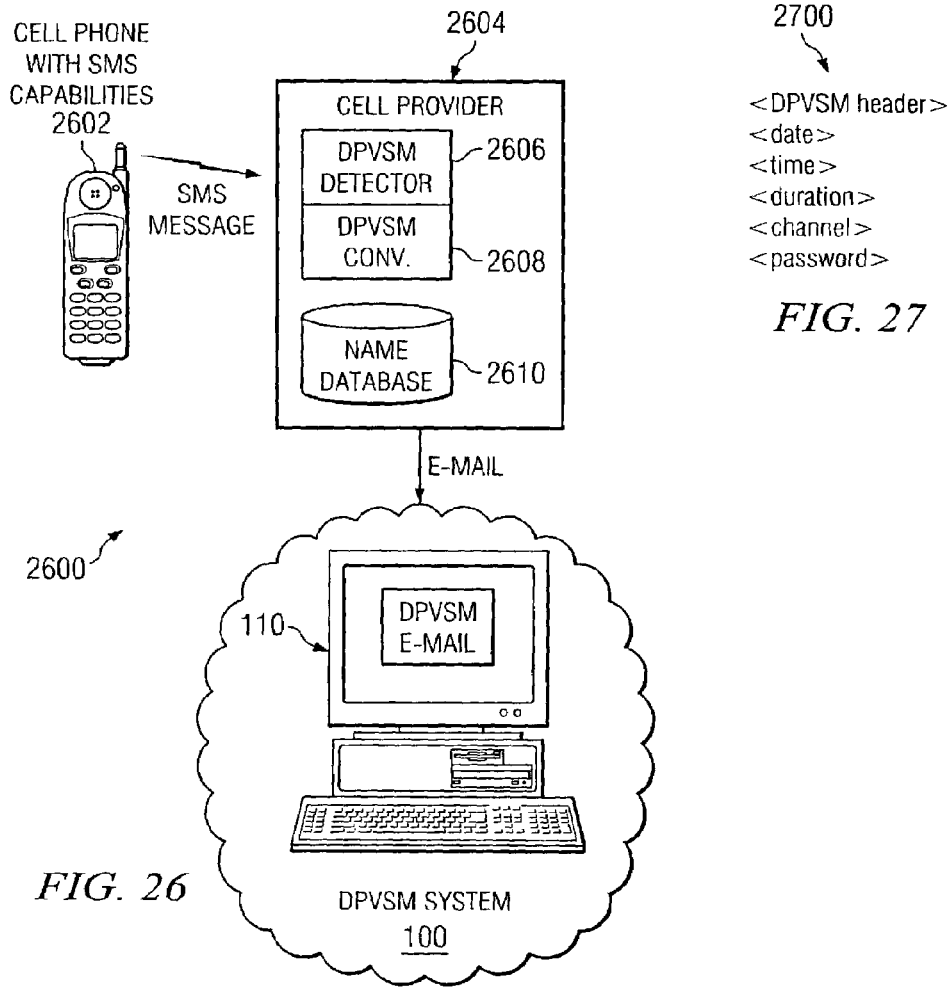
FIG. 27
FIG. 26
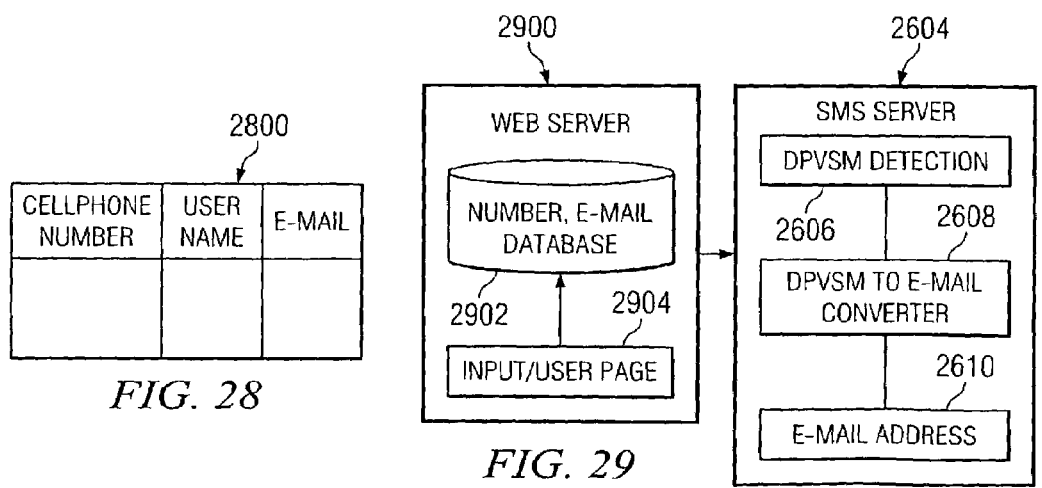
FIG. 28
FIG. 29

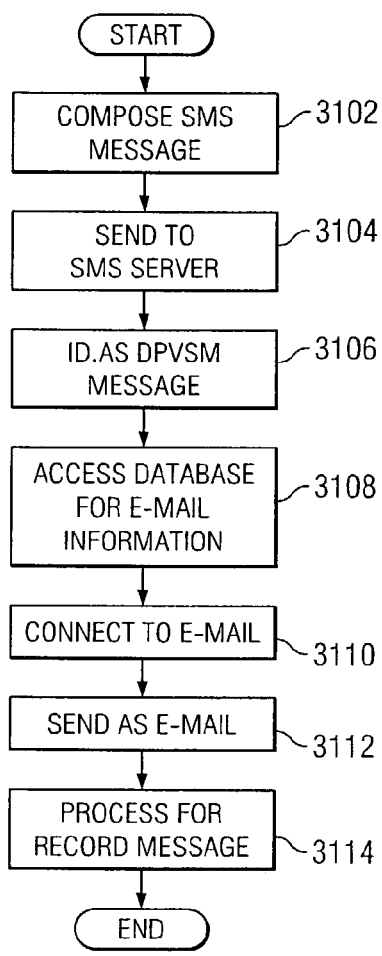
FIG. 30
FIG. 31
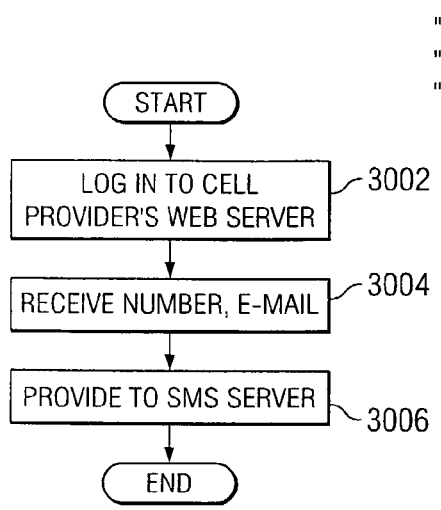
FIG. 32
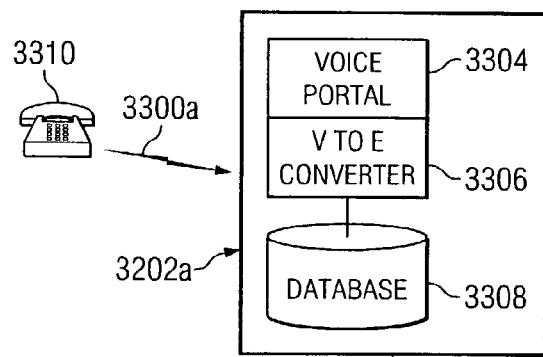
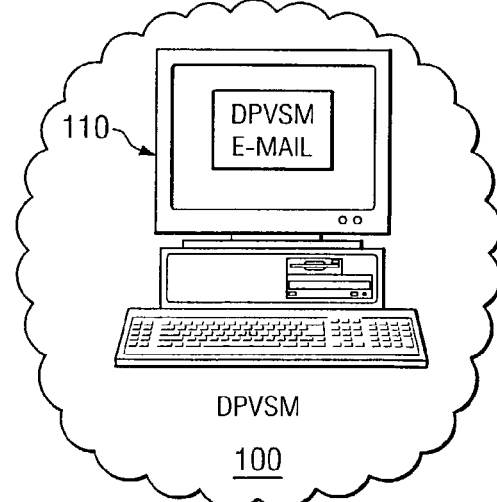
FIG. 33A

SYSTEM AND METHOD FOR INTEGRATED AUDIO STREAM MANAGER

CROSS REFERENCE TO RELATED APPLICATIONS

This application is related to commonly-assigned, co-pending application Ser. No. 10/383,894, titled SYSTEM AND METHOD FOR DIGITAL PERSONAL VIDEO STREAM MANAGER; application Ser. No. 10/384,483, titled SYSTEM AND METHOD FOR INTEGRATED COMMUNICATIONS CENTER; application Ser. No. 10/384,484, titled SYSTEM AND METHOD FOR SYSTEM AND METHOD FOR WIRELESS REMOTE CONTROL OF A DIGITAL PERSONAL MEDIA STREAM MANAGER; application Ser. No. 10/384,482, titled SYSTEM AND METHOD FOR E-MAIL CONTROL OF AN INTEGRATED COMMUNICATIONS CENTER; application Ser. No. 10/383,900, titled SYSTEM AND METHOD FOR INSTANT MESSAGING CONTROL OF AN INTEGRATED COMMUNICATIONS CENTER; application Ser. No. 10/383,777, titled SYSTEM AND METHOD FOR SHORT MESSAGE SERVICE CONTROL OF AN INTEGRATED COMMUNICATIONS CENTER; application Ser. No. 10/384,335, titled SYSTEM AND METHOD FOR VOICE PORTAL CONTROL OF AN INTEGRATED COMMUNICATIONS CENTER; and application Ser. No. 10/384,346, titled SYSTEM AND METHOD FOR CONTEXT-BASED SEARCHING AND CONTROL OF AN INTEGRATED COMMUNICATIONS CENTER, all filed concurrently herewith.

FIELD OF THE INVENTION

The present invention relates to telecommunications systems and, in particular, to an improved system and method for multimedia telecommunications system management.

BACKGROUND OF THE INVENTION

Many modern homes today have a television, a videotape recorder, a cable or satellite connection, and a personal computer with an Internet connection. Because these devices are relatively expensive and offer complementary features, there have been efforts to converge the television technologies with the personal computer/Internet technologies.

For example, some personal computers have been equipped with television tuner cards, which allow the reception of television programming through the cable or satellite connection. Such television tuner cards can also be equipped with video capture capabilities, to allow later playback of captured programming. However, equipping a personal computer with video capabilities has not gained wide acceptance amongst the general public as a replacement for a television, in part because the typical personal computer monitor is relatively small and, in particular, significantly smaller than the typical family room television. Moreover, the typical personal computer is equipped with a relatively more limited and inferior sound system, which can be disadvantageous when marketing to modern viewers who require, for example, high-fidelity sound or even a Surround Sound system.

Another convergence approach, known as WebTV, has been to provide the television with a set-top box and keyboard to allow, for example, Internet access through the television set and cable connection. While such systems are adequate for simple e-mail communication and limited Web browsing, WebTV also has failed to gain widespread acceptance, at least in part because the resolution of the typical television is much more crude than that of the computer monitor, and can also produce formatting idiosyncrasies which can make it difficult to view many web pages.

Each of these systems suffers from additional disadvantages which may have contributed to the failure to develop an effective converged video system: Personal computers are frequently upgraded and replaced; television sets and home entertainment systems, however, have a significantly longer life span.

As such, there is a need for a multimedia telecommunications system that provides improved convergence of television and personal computer based resources. There is a further need for a convergence system that allows the user to maintain separate television and personal computer based resources.

SUMMARY OF THE INVENTION

These and other drawbacks in the prior art are overcome in large part by a system and method according to embodiments of the present invention.

A multimedia telecommunications system according to an embodiment of the present invention includes a media subsystem and a network subsystem. The media subsystem couples a television to a media provider via a digital personal video stream manager. The media subsystem can also include an audio system, a video recording device, and a set-top media interface box. The network subsystem includes a personal computer having a network interface card and coupled to an Internet connection via a modem and a wireless network router. The digital personal video stream manager likewise includes a wireless network control and is adapted to receive control commands from the personal computer for supervising the recording of programming using the video recording device. The digital personal video stream manager can also receive and digitize broadband media from the media provider and transmit it via the wireless network to the personal computer. The personal computer can store the received media files for playback. The media files can be played back either via the personal computer itself or via the digital personal video stream manager on the television. User interfaces on the PC or television can be used to control media file or broadband media playback.

A digital personal video stream manager according to an embodiment of the present invention includes a control processor, a media interface, and one or more control interfaces. The media interface can receive broadband audio and video and convert it into digital file format for transmission on a wireless LAN, such as an IEEE 802.11 based wireless LAN, to a personal computer. The media interface can likewise receive digital media files from the personal computer via the wireless interface, and convert them to a format for playback by the audio system or television. Further, the digital personal video stream manager can receive controls from remote users to supervise media recording. The control interfaces allow control of the digital personal video stream manager, such as via infrared remote controls.

A multimedia telecommunications system according to an embodiment of the present invention implements an integrated audio stream manager in association with the digital personal video stream manager. Such an integrated audio stream manager employs a personal computer to record and store audio such as compact disk tracks. The personal computer can then contact one or more Internet web sites for CD indices to download a list of the tracks and provide a master list of all CDs stored. The digital personal video stream manager can then be used to supervise playback of the audio files via the connected audio system.

In certain embodiments, the multimedia telecommunications system can be provided with and controlled by a wireless 802.11 remote control device to control the digital personal video stream manager from anywhere in the house. The wireless remote may be provided with an LCD screen, an 802.11 interface, and an IP telephony interface. The LCD screen provides the user with a graphical interface that allows a user to interact with the digital personal video stream manager in a manner similar to that employed when using the personal computer. In addition, the IP telephony interface allows the user to make and receive IP telephone calls, such as Internet telephone calls. In such an embodiment, the personal computer may implement an IP telephone gateway.

One embodiment of a multimedia telecommunications system according to the present invention includes a system for e-mail control of the digital personal video stream manager, for example, to program a video recording device. A system including e-mail control of the digital personal video stream manager according to an embodiment of the present invention includes a personal computer having an e-mail client and equipping the e-mail client with a DPVSM control plug in. The DPVSM control plug in is adapted to identify a special DPVSM control e-mail which is then translated by the DPVSM control program. The digital personal video stream manager then activates at the appropriate time to record the program.

Another embodiment of the present invention includes a system for Instant Messaging based control of the digital personal video stream manager, for example, to program a video recording device. A system including Instant Messaging based control of the digital personal video stream manager according to an embodiment of the present invention includes a personal computer having an Instant Messaging client and equipping the Instant Messaging client with a DPVSM control plug in. The DPVSM control plug in is adapted to identify a special DPVSM control Instant Message which is then translated by the DPVSM control program. The digital personal video stream manager then activates at the appropriate time to record the program.

Another embodiment of the present invention includes a system for Short Message Service-based control of the digital personal video stream manager, for example, to program a video recording device. Such a system includes one or more cellular telephones including SMS capabilities and a DPVSM control module in the SMS server of the cellular service provider. The DPVSM control module is adapted to identify a special DPVSM control SMS message which is then translated by the DPVSM control module and converted to a DPVSM Instant Message or a DPVSM e-mail control message. The DPVSM Instant Message or a DPVSM e-mail control message is then transmitted to the user's personal computer, where the IM or e-mail plug in translates it and uses it to control the DPVSM.

Another embodiment of the present invention includes a system for voice portal-based control of the digital personal video stream manager, for example, to program a video recording device. Such a system includes a DPVSM control module at a server of a service provider. The DPVSM control module is adapted to respond to a user calling in a predetermined phone number and using an interactive voice response system, issue prompts and accept inputs for DPVSM control. The DPVSM control module then converts the inputs to a DPVSM Instant Message or a DPVSM e-mail control message. The DPVSM Instant Message or a DPVSM e-mail control message is then transmitted to the user's personal computer, where the IM or e-mail plug in translates it and uses it to control the DPVSM.

A voice portal system according to another embodiment of the present invention includes a voice portal with DPVSM control module provided locally at the user's personal computer. The DPVSM control module is adapted to respond to a user calling in and, using an interactive voice response system, issue prompts and accept inputs for DPVSM control.

Additional embodiments of the present invention include a context-based search system. Such a system may be maintained by a service provider and can identify a program and date and time without receiving complete details thereof; the DPVSM can then control the recording of the program using IM or e-mail based-techniques. The context-based search system includes a message receiver for receiving the DPVSM message; one or more databases for storing keywords and program information; a confirmation message generator for informing the user of identified programming; and a DPVSM control for causing the DPVSM to supervise the media recording once one of the identified results have been selected by the user.

A better understanding of these and other specific embodiments of the invention is obtained when the following detailed description is considered in conjunction with the following drawings.

BRIEF DESCRIPTION OF THE DRAWINGS

FIG. 9 is a diagram illustrating an audio stream manager system according to an embodiment of the present invention;

FIG. 10 is a diagram of an exemplary user interface according to an embodiment of the present invention;

FIG. 11 is a flowchart illustrating user interaction according to an embodiment of the present invention;

FIG. 18 illustrates an exemplary e-mail system according to an embodiment of the present invention;

FIG. 19 is a block diagram of an e-mail command window according to an embodiment of the present invention;

FIG. 20 is a flowchart illustrating operation of an embodiment of the present invention;

FIG. 26 is a diagram of a telecommunications system according to an embodiment of the present invention;

FIG. 27 is a diagram of an exemplary SMS command according to an embodiment of the present invention;

FIG. 28 is a diagram of an exemplary database according to an embodiment of the present invention;

FIG. 29 is a diagram of an exemplary SMS control system according to an embodiment of the present invention;

FIG. 30 is a flowchart illustrating operation of an embodiment of the present invention;

FIG. 31 is a flowchart illustrating operation of an embodiment of the present invention;

FIG. 32 illustrates exemplary voice portal interaction according to an embodiment of the present invention;

FIG. 33A and FIG. 33B illustrate exemplary telecommunications systems according to embodiments of the present invention;

DETAILED DESCRIPTION OF EMBODIMENTS OF THE INVENTION

System Overview

Figure 1A:
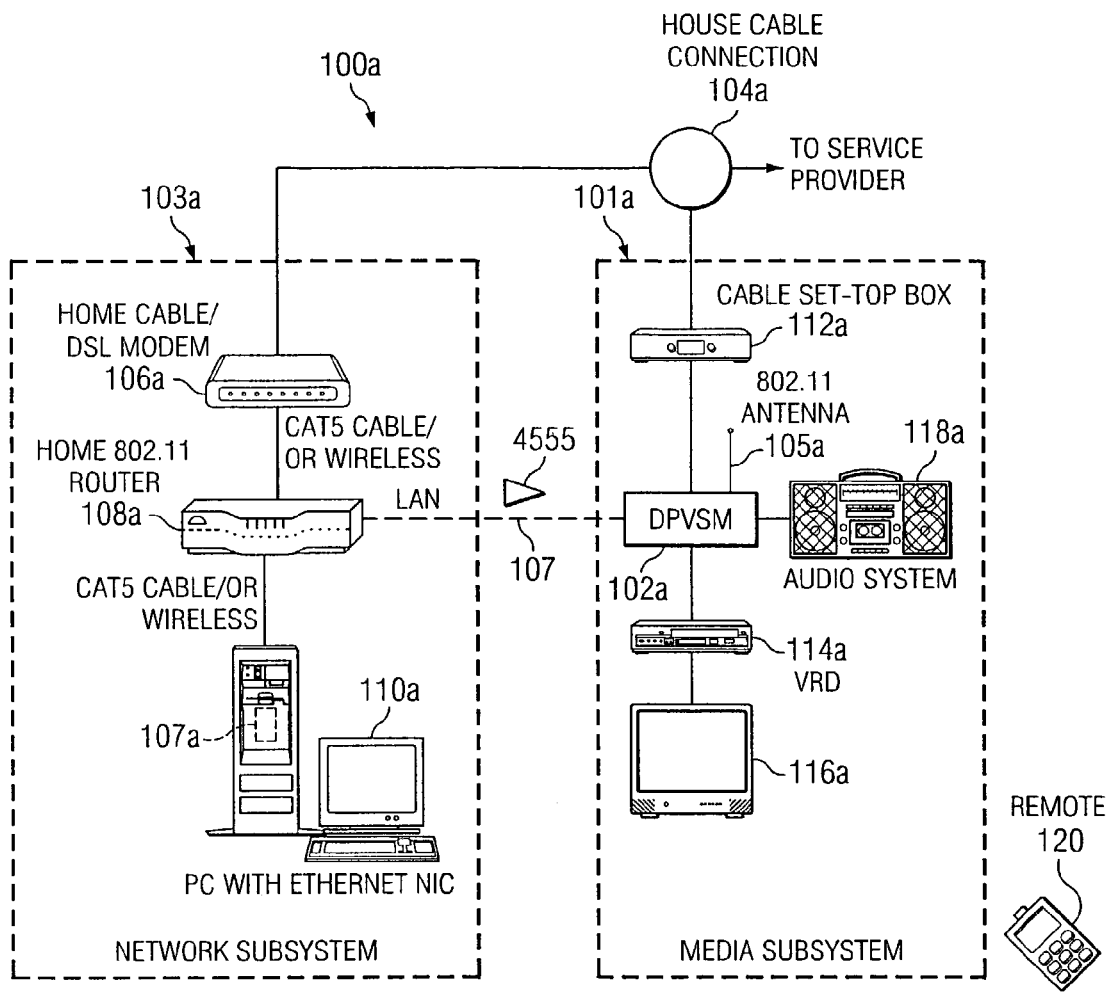
FIG. 1A and FIG. 1B illustrate telecommunication systems including digital video stream managers according to embodiments of the present invention.

Turning now to the drawings and, with particular attention to FIG. 1A, a multimedia telecommunications system according to an embodiment of the present invention is shown and generally identified by the reference numeral 100a. As will be discussed in greater detail below, the multimedia telecommunications system 100a provides users with a bridge between their personal computer and their home entertainment system. The multimedia telecommunications system 100a receives broadband media (e.g., audio and video) streams from a broadband signal source, and digitizes, encapsulates and transmits to and from a personal computer using a local area network technology, such as a wireless LAN, for intelligent processing, recording and control from the personal computer. Digital video can also be captured from the Internet and sent for playback on the home entertainment system.

In particular, shown is a multimedia telecommunications system 100a including a media stream manager, referred to as a digital personal video stream manager 102a (DPVSM), according to an embodiment of the present invention. The system 100a includes a media or home entertainment subsystem 101a and a network or computer subsystem 103a. As will be described in greater detail below, the media subsystem 101a is based around a television 116a and other broadband media devices, while the network subsystem 103a is based around a personal computer 110a and other local area network devices.

As shown, the DPVSM 102a is coupled via a cable set-top box 112a to a house cable connection 104a. The cable set-top box 112a may be any standard cable box or broadband media interface such as, for example, a satellite dish interface. The house cable connection 104a typically may be a connection for a coaxial cable, but other connections are contemplated. As shown, the DPVSM 102a further may couple to an audio system 118a, and, via a video recorder 114a to a television 116a. The video recorder 114a may be embodied, for example, as any of a variety of video recording devices, including, for example, a videocassette recorder (VCR) or an optical disk recorder. In addition, an infrared (IR) remote control 120 may be provided for control of the DPVSM 102a and various of the other components of the system. The IR remote 120 may be any remote capable of interacting with a television-screen based interface and allowing the user to make selections therefrom.

The DPVSM 102a may be adapted to control various functions of the various components of the media subsystem 101a, such as turning on and off the various devices, or programming the video recorder for future program recording. The DPVSM 102a may program the devices via their coaxial cable connections, in much the same way a cable company controls operation of the cable set-top box. In other embodiments, separate control interfaces, such as wireless interfaces or infrared interfaces, may be provided. For example, if the video recording device has an infrared interface, the DPVSM 102a could similarly send infrared control signals to the video recording device for control thereof.

As will be described in greater detail below, the DPVSM 102a can communicate with elements of the network subsystem 103a wirelessly over a local area network 107 via an 802.11 antenna 105a. In particular, in the embodiment illustrated, the network subsystem 103a couples to the house cable connection 104a via an Internet access device such as a cable or DSL modem 106a. It is noted that, in embodiments in which the modem is a DSL modem, an Internet connection separate from the cable connection would be provided. The modem 106a couples to a home 802.11 router 108a and a personal computer 110a, which may be a laptop or desktop computer. In the embodiment illustrated, the router 108a couples to the modem 106a and the PC 110a via CAT5 cable. It is noted, however, that other interfaces, such as wireless interfaces, could be used instead of CAT5 cable. The PC 110a is equipped with an Ethernet network interface card (NIC) 107a, or other network interface, for communicating with the router 108a. As will be described in greater detail below, the PC 110a is able to communicate, for example, control commands 4555, with the DPVSM 102a via the wireless router 108a, to control various elements of the media subsystem 101a. It is noted that an advantage of certain embodiments of the DPVSM 102 is that it need not provide its own mass storage device for storing media files; rather, it can make use of the personal computer 110a's storage.

Figure 2A:
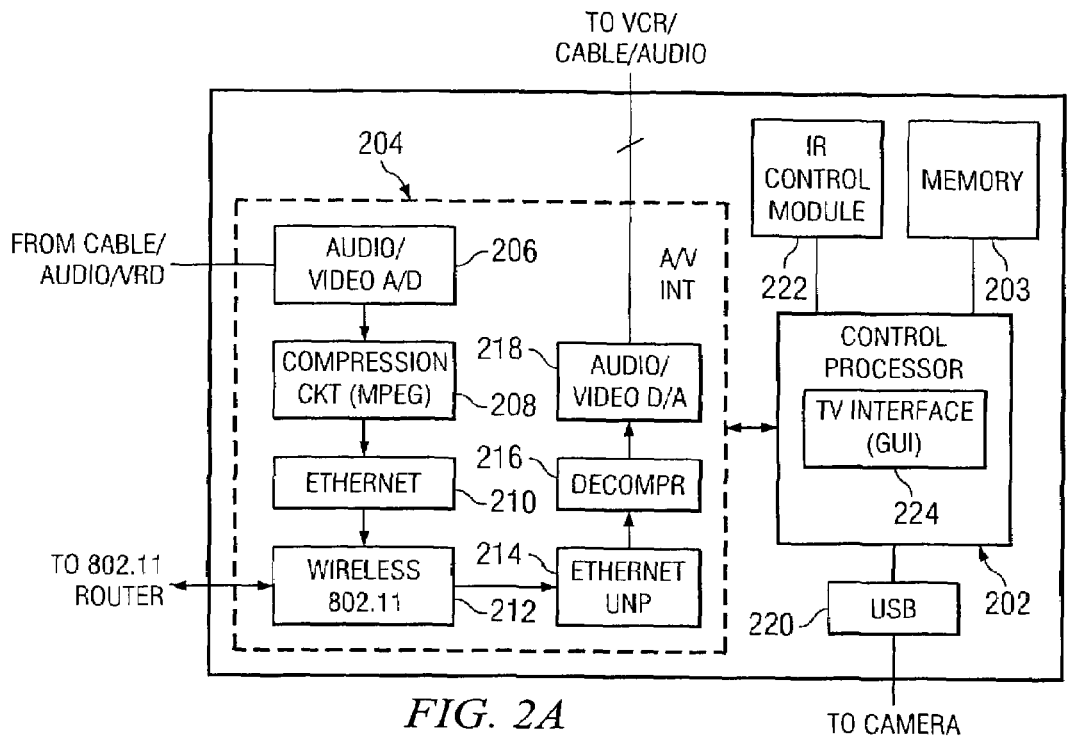
FIG. 2A and FIG. 2B are block diagrams of exemplary digital media stream managers according to embodiments of the present invention.

More particularly, turning now to FIG. 2A, a block diagram of the exemplary DPVSM 102a of FIG. 1A is shown. In the embodiment illustrated, the DPVSM 102a includes a control processor 202 and an audiovisual or multimedia interface 204. The multimedia interface 204 receives audio and/or video over the cable connection 104a (FIG. 1A) or other audio/video input to a multimedia interface such as an audio/video analog-to-digital converter 206. The video signal is then received at a compression circuit 208 for conversion into, for example, MPEG format. The MPEG video is then provided to an Ethernet interface 210 for packing into Ethernet packets. The Ethernet packets are then provided to a local area network interface, such as a wireless 802.11 interface 212 for transmission to the 802.11 router, if desired. The video can then be transmitted to the personal computer 110 (FIG. 1A). Thus, the DPVSM 102a provides an interface for receiving video signals from the cable or satellite TV connection, and converting them into a digital format readable by the personal computer 110.

Similarly, Internet audio and video content can be received by the 802.11 router 212 from the personal computer 110a and displayed over the television or recorded on the video recording device 114a. Thus, the data is unpacked from the Ethernet packets at 214. If in, for example, MPEG format, the resulting data is decompressed in the decompression unit 216 and provided to the video recording device 114a or television 116a via the audio/video digital-to-analog converter 218. It is noted that, in certain embodiments, the audio-video signal arriving over the cable connection and cable box may already be in digital format. Thus, the analog-to-digital and digital-to-analog converters 206, 218 may not be necessary, although conversion between digital formats may be required.

The control processor 202, which may be embodied as a Pentium-type or other microprocessor or microcontroller, provides a supervisory function for the other components of the media subsystem 101a and can receive and store commands in memory 203 for later execution, such as recording a program using the video recording device 114a, as will be explained in greater detail below. The control processor 202 is thus coupled to send and receive control signals via the wireless 802.11 interface 212. The control processor 202 may also be coupled to or implement other control interfaces, such as an infrared module interface 222, a Universal Serial Bus (USB) interface 220, and a television user interface 224.

The USB interface 220 allows peripheral devices to be coupled in and played back; for example, a camera could be coupled to the USB interface 220. The television user interface 224 is used to generate a user interface for display on the television screen, in much the same way that a videocassette recorder or digital versatile disk (DVD) player provides a control interface. The IR module 222 allows reception of commands and selections using an IR remote control 120 in conjunction with the television user interface 220.

Figure 3:
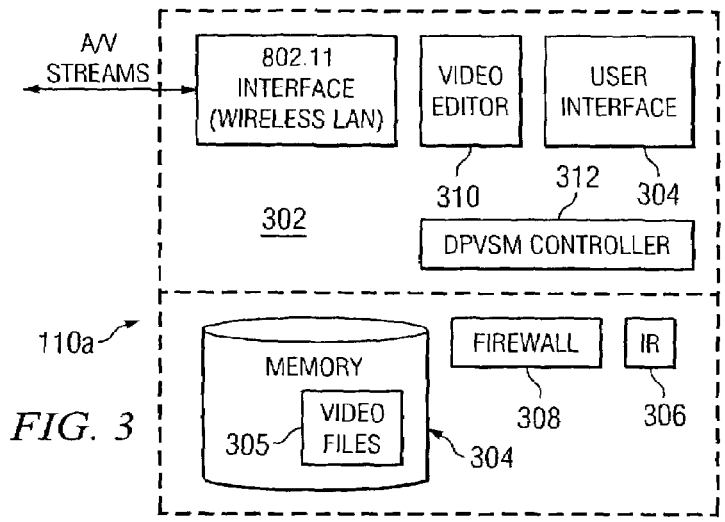
FIG. 3 is a block diagram of an exemplary multimedia computer according to an embodiment of the present invention.

As noted above, a multimedia telecommunications system according to embodiments of the present invention includes a media subsystem 101a and a network subsystem 103a. The network subsystem 103a is based around a personal computer 110a, such as the personal computer shown in FIG. 3, which can access the Internet via the cable or other connection. As shown, the personal computer 110a includes one or more processors 302 implementing one or more software modules. In the example illustrated, shown are a user interface module 304, a DPVSM controller module 312, and a video editor module 310. One or more of these modules may be embodied as Web browser plug ins. As will be described in greater detail below, the user interface module 304 allows video to be displayed on the computer monitor (not shown) and for various files and controls to be executed. The DPVSM controller module 312 permits viewing or playback of locally stored media files, such as audio or video files, and control of the DPVSM 102A (FIG. 1A). The video editor 310 allows editing of local video files and may be implemented as any of a variety of video editing programs. As will be discussed in greater detail below, the media files may be media files downloaded from the Internet or may be captured from the media subsystem 101.

The processor 302 may couple to a wireless LAN interface 306 (e.g., a 802.11 Ethernet NIC) to receive audio and video streams from the house cable connection 104a and the media subsystem 101a (FIG. 1A). In addition, the processor 302 couples to a memory 304 for storing media files 305 and programs (not shown). The personal computer 110a also may include an infrared interface 306 for using an infrared mouse or keyboard control. Finally, in certain embodiments, a service provider may maintain a web site that allows use of the personal computer 110 to download upgrades to the DPVSM 102's control programs and modules.

Figure 1B:
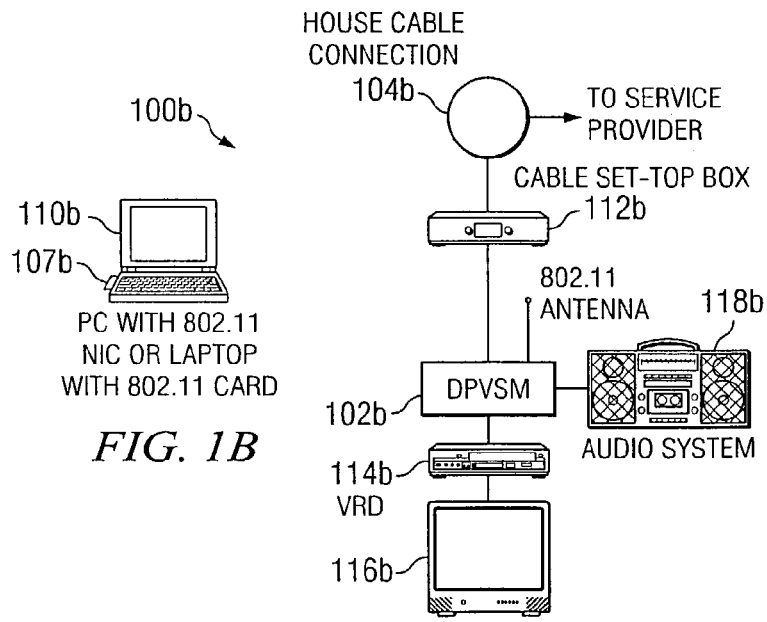

As noted above, a multimedia telecommunications system according to embodiments of the present invention may take a variety of configurations. One such configuration is shown in FIG. 1A; another is shown in FIG. 1B. In particular, FIG. 1B illustrates a personal digital video system 100b including an integrated digital personal video stream manager 102b. In this embodiment, the digital personal video stream manager 102b includes an integrated Internet access device such as a cable or DSL modem and an integrated 802.11 router, as will be explained in greater detail below.

As shown, the system 100b of FIG. 1B includes a house cable connection 104b connecting to the cable provider. A cable set-top box 112b couples the house cable connection 104 to the integrated digital personal video stream manager 102b. The digital personal video stream manager 102b then couples to an audio system 118b, a video recording device 114b, and television 116b. It is noted that in other embodiments, the cable set-top box 112b may also be integrated with the digital personal video stream manager 102b.

A personal computer 110b, which can be either a desktop or a laptop computer, is also supported and can include an 802.11 network interface card or PC Card 107b. Thus, the personal computer 110b itself need not support a modem or other Internet connection, beyond the NIC. The personal computer 110 may be provided with a firewall, such as firewall 308 of FIG. 3, however.

As can be appreciated, the digital personal video stream manager 102b with an integrated cable modem is convenient when the service provider is also the cable company. If the Internet connection is a DSL connection or other telephone connection, then a separate DSL modem and telephone jack also could be integrated with the DPVSM 102b.

Figure 2B:
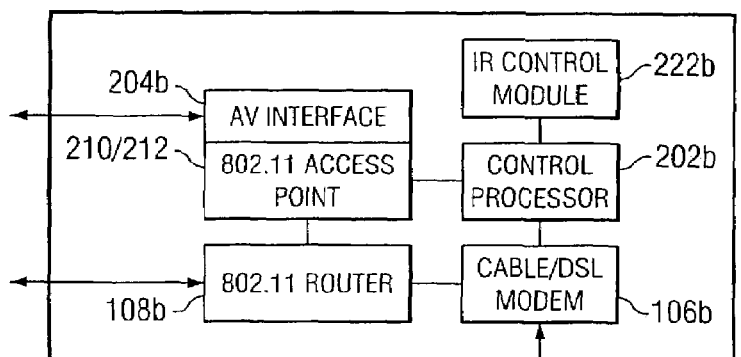

A block diagram of an exemplary integrated digital personal video stream manager 102b is shown in FIG. 2B. As shown, the digital personal video stream manager 102b includes a control processor 202b and an audio/video interface 204b. The audio/video interface 204b is generally similar to that of FIG. 2A, and includes an wireless LAN access point (e.g., Ethernet and wireless 802.11 interface 210b, 212b). An integrated cable or DSL modem 106b is also provided, as is an integrated 802.11 router. Other components are generally similar to those of FIG. 2A and can include a memory 203b, an Infrared control interface 222b, and a Universal Serial Bus interface 230b.

In what follows, for sake of clarity, in describing operation of embodiments of the present invention, the system of FIG. 1A and FIG. 2A will be referred to, it being understood that the teaching of the present invention are applicable to a variety of network and device configurations.

Figure 4:
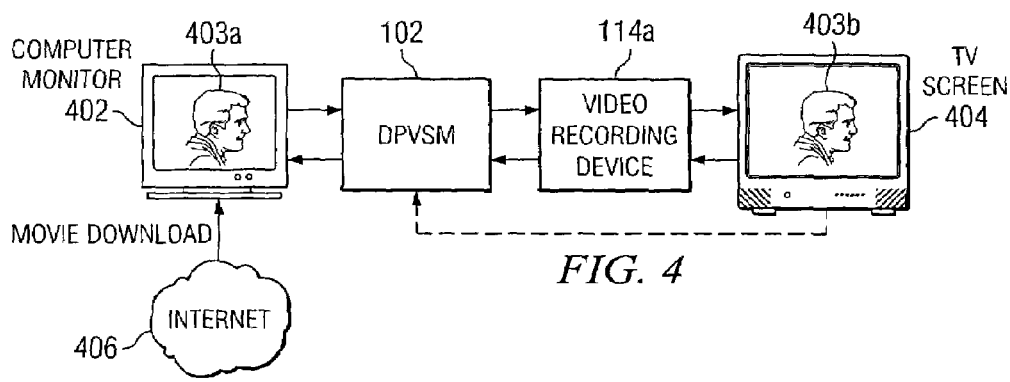
FIG. 4 illustrates schematically operation of an embodiment of the present invention.

According to one aspect of the present invention, video that is seen on the personal computer 110a may also be viewable via the DPVSM 102a on the television 116a, and vice versa. This is illustrated schematically with reference to FIG. 4. In particular, shown are a computer monitor 402 and a television screen 404. Also shown are the digital personal video stream manager 102a and a video recording device 114a. Other elements of FIG. 1A are omitted for clarity.

As shown, a video 403a, representative of a video file, for example, is viewable on the monitor 402. The video 403a may be an Internet media file downloadable from the Internet 406, via the house cable or other Internet connection 104a. According to embodiments of the present invention, the video 403a can be transmitted to the digital personal video stream manager 102 for conversion into a television video format and viewable on the television screen 404, as video 403b. The video 403a can further be recorded onto a recording medium such as videotape using the video recording device 114a. Similarly, a video 403b being shown on the television screen 404, either from the cable connection or on replay from the recording device 114a, can be transmitted via the digital personal video stream manager 102 for display on the personal computer 110a as a video file 403a.

Figure 5B:
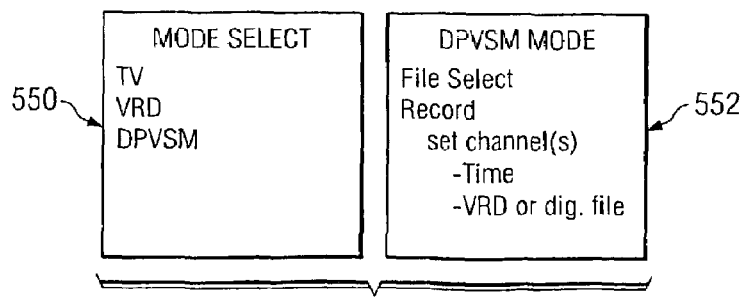
FIG. 5A and FIG. 5B illustrate exemplary user interfaces according to embodiments of the present invention.
Figure 5A:
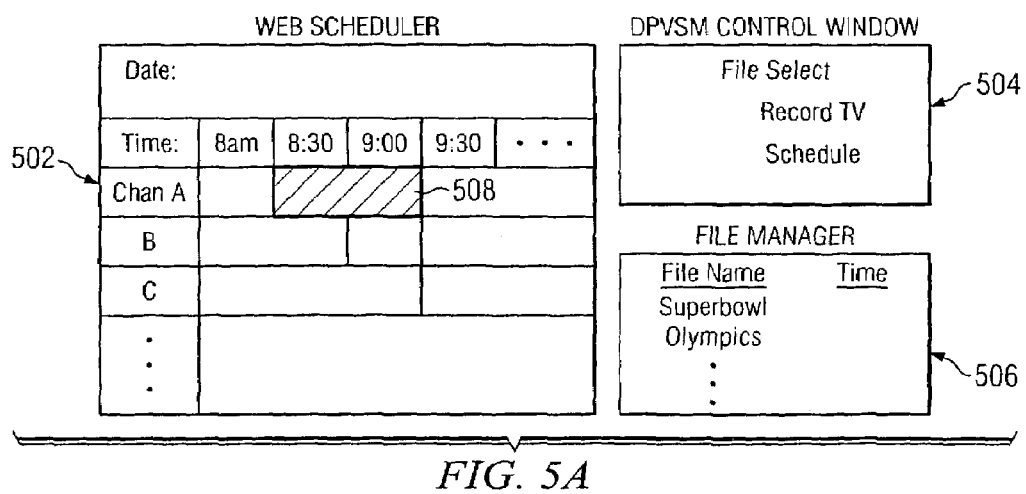

The digital personal video stream manager 102a can be controlled from either the personal computer 110a or using an infrared remote control 120a, via a graphical interface using the television screen. FIG. 5A and FIG. 5B illustrate exemplary user interfaces for such purposes.

FIG. 5A illustrates an exemplary user interface viewable on the computer monitor and generated, for example, by a digital personal video stream manager program which may be implemented as a Web browser plug in. Shown are three windows: a web scheduler 502; a DPVSM control window 504; and a File Manager window 506.

The DPVSM program window 504 allows activation of the DPVSM, selection of files, recording, scheduling, and the like. It can also be used to activate or interface with the web scheduler 502 and the file manager 506.

The web scheduler 502 may be a web page accessible via the Internet set up by the service provider, or it may be an individual network's web page. In certain embodiments of the present invention, the user can access the web page to determine a network program schedule and control the digital personal video stream manager 102a and thus the video recording device 114a to record a program remotely. For example, the user could click on a selected program 508, including the time and date and channel. This information can then be downloaded to the DPVSM control program 312 (FIG. 3) and either stored at the computer or transmitted to the digital personal video stream manager 102a itself. At the designated time, the digital personal video stream manager 102a causes the video recording device 114a to record the selected program. Alternatively, the DPVSM control program 312 can be used to record the program as a video file 305, stored on the computer 110a.

The file manager 506 can be used to access stored media files and selected for playback either as files on the computer or converted and transmitted to the digital personal video stream manager 102a for viewing on the television.

Similarly, FIG. 5B illustrates exemplary user interfaces that can be generated by the digital personal video stream manager 120a and displayed on the television. The user can scroll through and make choices using, for example, an infrared remote 120 (FIG. 1A) in much the same way that a typical video cassette recorder can be programmed. Thus, the television interface of FIG. 5B includes an entry screen 550 for making a mode selection (e.g., TV, VCR, DPVSM). Selection of the DPVSM mode may cause display of a screen such as screen 552. The screen 552 allows for file select, record, set channels, time, and VCR or digital file format, among other things.

Figure 6:
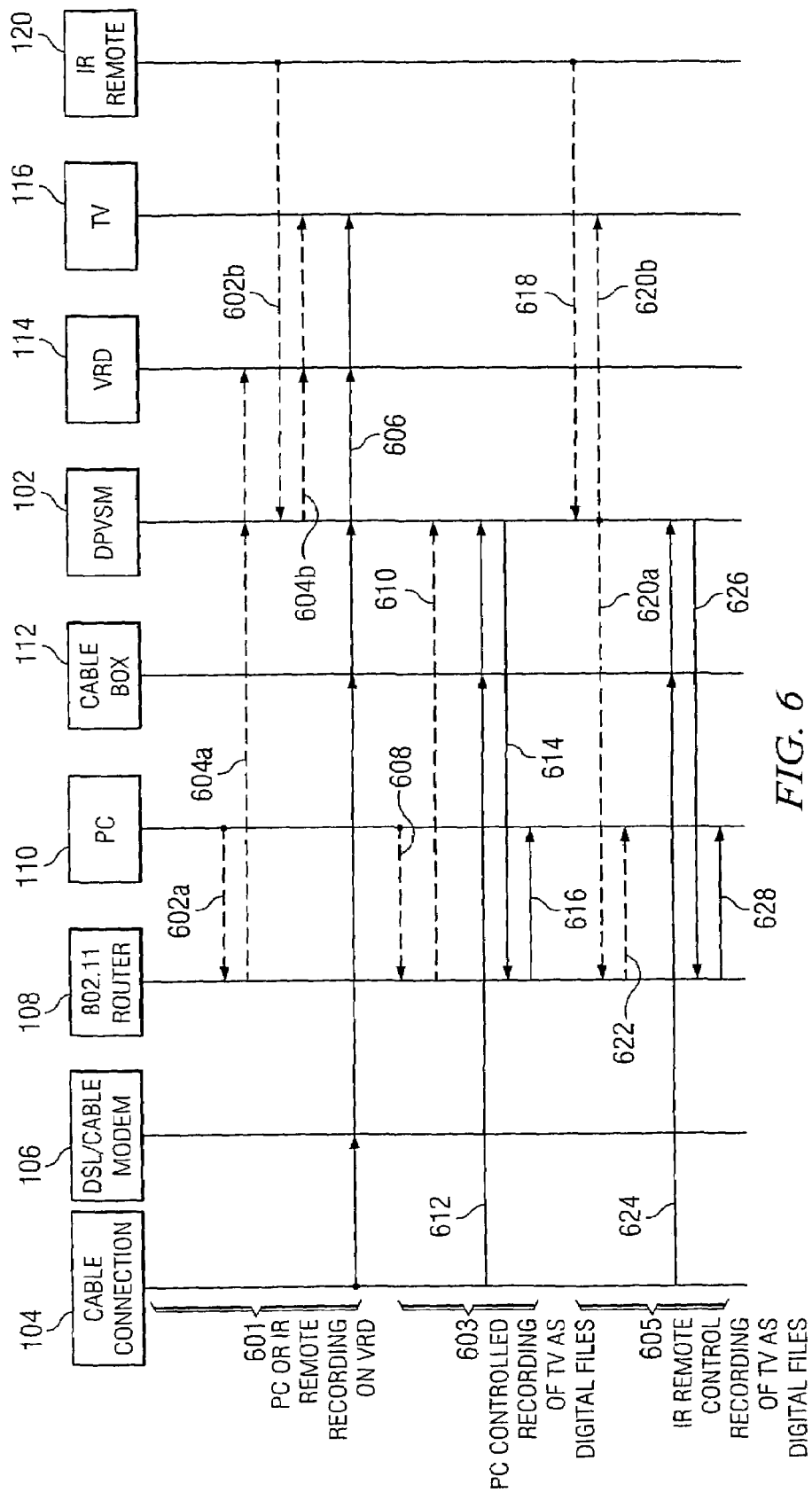
FIG. 6 is a diagram of signaling flow according to an embodiment of the present invention.

Turning now to FIG. 6, a signaling diagram illustrating operation of various aspects of the present invention is shown. In particular, signaling for television or broadband recording, either on video or as digital files is shown. Shown are the cable connection 104, DSL or cable modem 106, 802.11 router 108, personal computer 110, cable box 112, digital personal video stream manager 102, video recording device 114, television 116, and IR remote 120.

Recording using the video recorder 114 by use of the personal computer 110 or the infrared remote 120 is shown at 601. Personal computer-controlled remote recording is initiated at 602a, where the personal computer 110 can send one or more record commands via the 802.11 router 108 to arrive at the digital personal video stream manager 102 at 604a. The digital personal video stream manager 102 then sends a corresponding command to the video recorder 114 to set the time and date and channel of the recording. Alternatively, the user can employ the IR remote 120 to control or program recording via the digital personal video stream manager 102. Thus, at 602b, the user can send one or more control signals to the digital personal video stream manager 102, which causes a display on the television 116 of the user interface, such as that of FIG. 5. The user can then program the video recorder 114 at 604b. In either case, the broadband video signal is received from the cable connection 104 and recorded at the video recorder 114 at 606.

The personal computer 110 can also be used to control recording of the broadband signal as digital video files, as shown at 603. At 608, the personal computer 110 sends a command 608 via the 802.11 router 108 to the digital personal video stream manager 102, as shown at 610. At 612, the broadband video signal is received from the cable connection 104 to the digital personal video stream manager 102 via the cable box 112. The digital personal video stream manager 102 then converts the received broadband signal to a digital file format and transmits it via the 802.11 router 108, as seen at 614, 616, to the personal computer 110. The personal computer 110 can then store the file in its media database for alter playback.

The IR remote 120 can also be used to control recording of broadband video as digital files, as shown at 605. At 618, the IR remote 120 is used to contact and send commands to the digital personal video stream manager 102. At 620b the DPVSM 102 activates the TV based GUI, which is then used to program or control the recording of the selected program. At 620a, the DPVSM 102 sends the commands via the router 108 to the personal computer 110 at 622. At 624, the broadband signal is received from the cable connection 104 to the DPVSM 102. The DPVSM 102 then converts the received broadband signal to one or more digital files and transmits them to the personal computer via the 802.11 router, at 626, 628.

Figure 7:
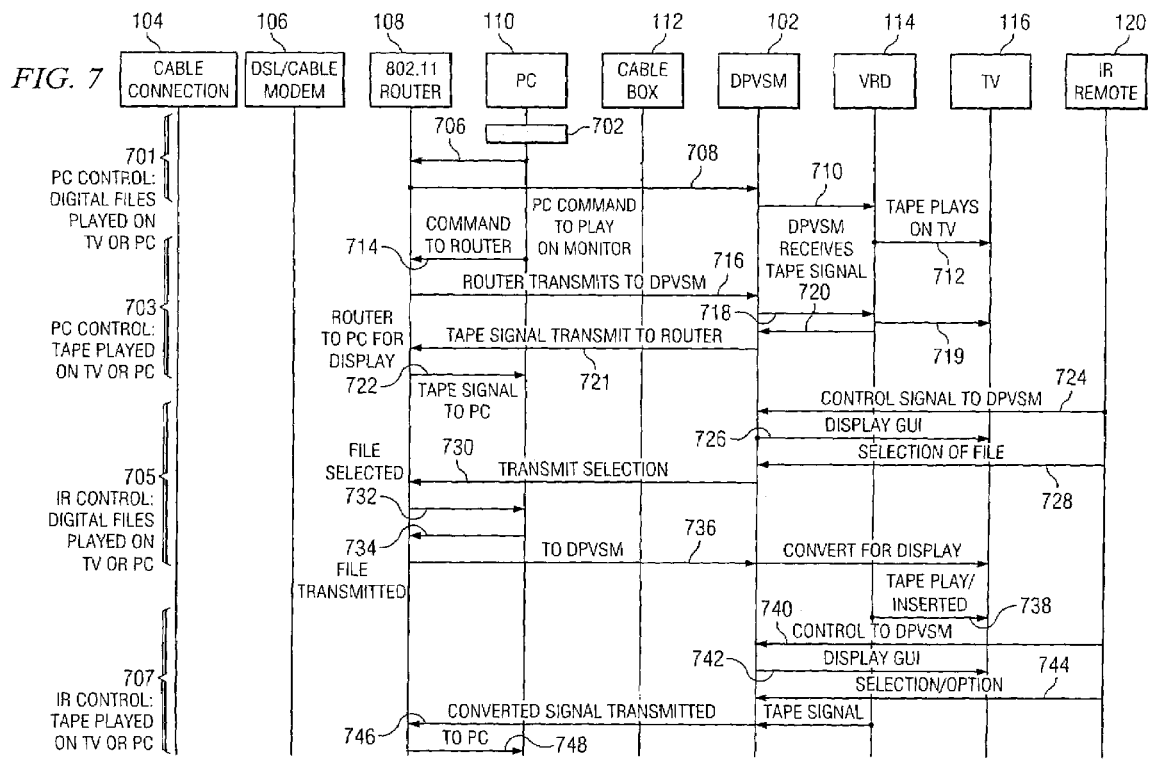
FIG. 7 is a diagram of signaling flow according to an embodiment of the present invention.

FIG. 7 is a signaling diagram illustrating video playback according to an embodiment of the present invention. Shown are the cable connection 104, DSL or cable modem 106, 802.11 router 108, PC 110, cable box 112, DPVSM 102, VCR 114, TV 116, and IR remote 120.

Personal computer control of playback of digital files is shown at 701. At 702, the personal computer 110 can be used to access the database in memory and play one or more selected files. The selected video file can also be played on the television via the DPVSM 102. Thus, the personal computer 110 can be used to select a file and designate it for playback on the television 116. At 706, the personal computer 110 sends a command via the router 108, which is received at the DPVSM 102, at 708. The DPVSM 102 then converts the received file into a format useable by the video recorder 114 and transmits it via the video cable to the video recorder, at 710. If the video recorder 114 has a tape, the file can be recorded by the tape and played on the television 116, at 712.

The use of the personal computer 110 to control tape playback is shown at 703. The personal computer 110 can activate its DPVSM control program 312 (FIG. 3) and select a tape control option(s). At 714, a tape play command is transmitted to the router 108, which then provides it to the DPVSM 102 at 716. At 718, the DPVSM 102 reads the command and directs the video recorder 114 to play the tape. If desired or if selected originally, the tape can play on the television 116, as shown at 719. If it is wished to play the tape on the personal computer 110, then at 720, the DPVSM 102 receives the tape broadband signal and converts it into a video digital file format and transmits it to the router 108 at 721. At 722, the router 108 then provides the file to the personal computer 110 for display using the video software.

As noted above, the IR remote 120 can also be used to playback digital files, either via the television 116 or on the personal computer 110, as shown at 705. At 724, the IR remote 120 is used to send one or more control signals to the DPVSM 102. At 726, the DPVSM 102 displays the GUI on the television screen. At 728, the user can use the IR remote 120 to select a file for viewing, and whether it is to be viewed on the television 116 or the personal computer 110. The selection is transmitted to the personal computer 110 via the router at 730 and 732. The personal computer 110 then selects the file from the database 305 (FIG. 3) and transmits it to the DPVSM 102 via the router 108, at 734, 736. Alternatively, the personal computer 110 can simply run the file locally on the PC monitor. If selected for TV display, the DPVSM 102 then converts the file for display by the television 116. As discussed above, this may be done concurrently with recording the video stream on a tape inserted into the video recorder 114.

The IR remote 120 can also control playback of a tape inserted in the video recorder 114, either at the television 116 or the personal computer 110. As seen at 738, a tape in the video recorder 114 can be played back on the television 116. The IR remote 120 can then send a signal to the DPVSM 102, at 740. At 742, the DPVSM 102 displays the television based GUI. At 744, the IR remote 120 can be used to select a "Play Tape on PC" option. The DPVSM 102 then receives the video signal from the video recorder 114 and converts it to the digital file format. It is then transmitted to the personal computer 110 via the router 108 for playback, at 746, 748.

Figure 8:
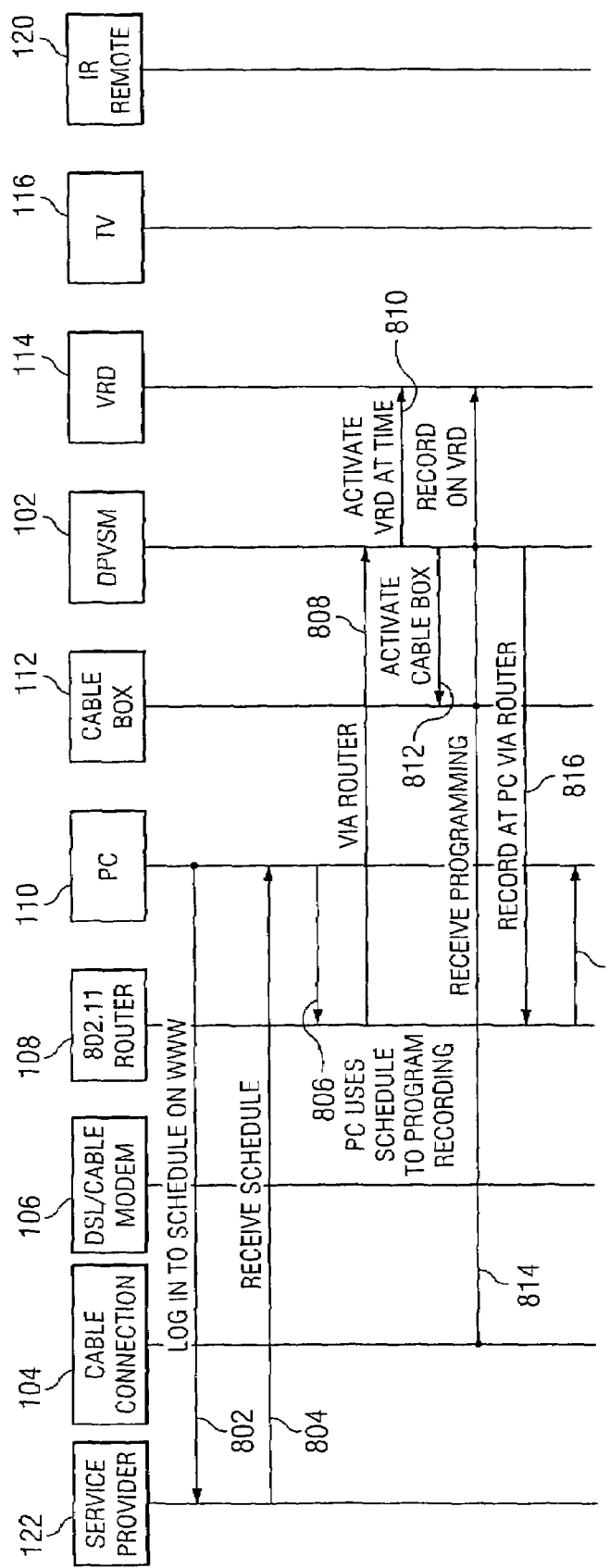
FIG. 8 is a diagram of signaling flow according to an embodiment of the present invention.

As noted above, one aspect of the present invention is an ability to schedule recording of television programming using a World Wide Web interface. This is illustrated more particularly with reference to FIG. 8. Shown are the cable connection 104, DSL or cable modem 106, 802.11 router 108, personal computer 110, cable box 112, DPVSM 102, video recorder 114, television 116, and IR remote 120. At 802, the personal computer 110 logs in to a service provider 122 using an Internet connection via the DSL or cable modem 106. The service provider 122 may maintain a web site having television schedule information in a subscriber-accessible format, which is then downloaded to the user's browser, at 804. The personal computer 110 can then display the schedule or schedules as described above and select one or more programs for recording. Then, at 806 and 808, the personal computer 110 can send a command to the DPVSM 102 via the router 108 that it should supervise the recording of the selected programming. The DPVSM 102 then stores the information until the designated time and then activates the video recorder 114 and cable box, if necessary. The video recorder 114 will then receive the programming at 814, which can then be recorded on the 30 video recorder 114. In addition, or in the alternative, the received broadband signal can also be converted by the DPVSM 102 into the digital file format and transmitted to the personal computer 110 for storage, at 816, 818.

Integrated Audio Stream Manager

According to one aspect of the present invention, an audio stream manager is provided in a manner similar to that of the video stream manager discussed above. More particularly, such an audio stream manager provides a digital jukebox which allows audio streams to be recorded from media disks, such as compact disks (CDs), or downloaded from the Internet and then played through the DPVSM 102 and stored on the personal computer 110. The audio streams are accessible by a file system or master index generated from downloaded CD databases of playlists.

The audio stream manager may be embodied, for example, as a system similar to the systems of FIG. 1A and FIG. 1B. For clarity of discussion, FIG. 9 is a diagram schematically illustrating an integrated audio stream manager according to an embodiment of the present invention. Shown are a DPVSM 102, an audio system 118, a personal computer 110, and one or more CD database servers 904, typically accessible via the Internet.

The personal computer 110 includes a jukebox utility 900 and a local media disk player 901 such as a compact disk or DVD player. The personal computer 110's memory 304 may be used to store music or other audio files 909. As will be discussed in greater detail below, the jukebox utility 900 is capable of converting a received CD track into a digital file format, such as MP3; downloading song lists from Web sites; and creating DPVSM-readable lists of songs or audio files for use in accessing the corresponding audio files 909 for playback. The audio files 909 are then available through a graphical user interface, either on the television 116 (FIG. 1A) or on the personal computer 110.

The DPVSM 102 may include an audio interface for coupling to the audio system 118 and the personal computer 110 via the network; such an interface is generally similar to the interface 204 (FIG. 2A) for use with video. The DPVSM 102 may also include a jukebox control utility 902, typically implemented by the controller 202, for communicating with the jukebox utility 900 and generating a jukebox user interface accessible via the television screen, in a manner similar to that discussed above with reference to the video streams.

Exemplary use of an Internet CD playlist database as a basis for DPVSM indices is shown in FIG. 10. Shown in FIG. 10 are a Web page 903 having an exemplary CD database entry 904. As shown, the CD database entry 904 includes at least a CD identifier 1020 and a list of tracks 1022. The user can use his personal computer 110's web browser to manually or automatically access the web page 903 and download the CD directory and associate each track with a file name. This is illustrated more particularly at 1002, which shows an exemplary CD or jukebox file listing 1002, typically stored in memory 305. Shown at 1002 are the CD name 1004, track identifiers 1005, and filenames 1006 associated therewith. It is noted that these filenames 1006 may be default file names based on the track identifier or may be user input.

Once the particular CD has been entered and its tracks converted to digital file format, the CD is indexed in a master list, such as that shown at 1008. In particular, shown at 1008 are a filename listing 1009*a*, a CD listing 1009*b*, and a track listing 1009*c* for each file 1010*a*, 1010*b* . . . 1010*n*. The listings can be arranged by CD, or alphabetically by file name, or randomly, any other desired ordering for playback or selection.

Operation of the audio stream manager according to an embodiment of the present invention is shown in the flowchart of FIG. 11. In step 1102, a user of the personal computer 110 can insert a disk into the player 901 (FIG. 9). At step 1104, the jukebox utility 900 converts the received CD track into a digital file format, such as MP3, and stores it in memory 305 as an audio file 909. At step 1106, the jukebox utility 900 accesses a predetermined Internet Web site 903 having a database of CDs and track listings, corresponding to the converted CD. The listing is then downloaded by the jukebox utility 900 and formatted into an index 1008, in step 1108. It is noted that, in other embodiments, the user could simply type in an index of his own making. At step 1110, the jukebox utility 900 sends the index to the DPVSM 102 and, particularly, to the control utility 902. At step 1112, the DPVSM 102 can be used to display the index listing on the television screen. At step 1114, the user can use a remote, such as an infrared remote 120, to select the desired track or audio file. Finally, at step 1116, the DPVSM 102 will receive the file via the network and play the selected file on the audio system 118. It is noted that in certain embodiments, the DPVSM 102 can convert an audio file from a digital format to an analog format, or between digital formats, or merely act as a "conduit" to relay a digital file for playback on the audio system. Thus, the audio system may be embodied as any of a variety of known analog or digital audio systems capable of playing, for example, compact disks or MP3 files or receive radio transmissions.

Figure 12:
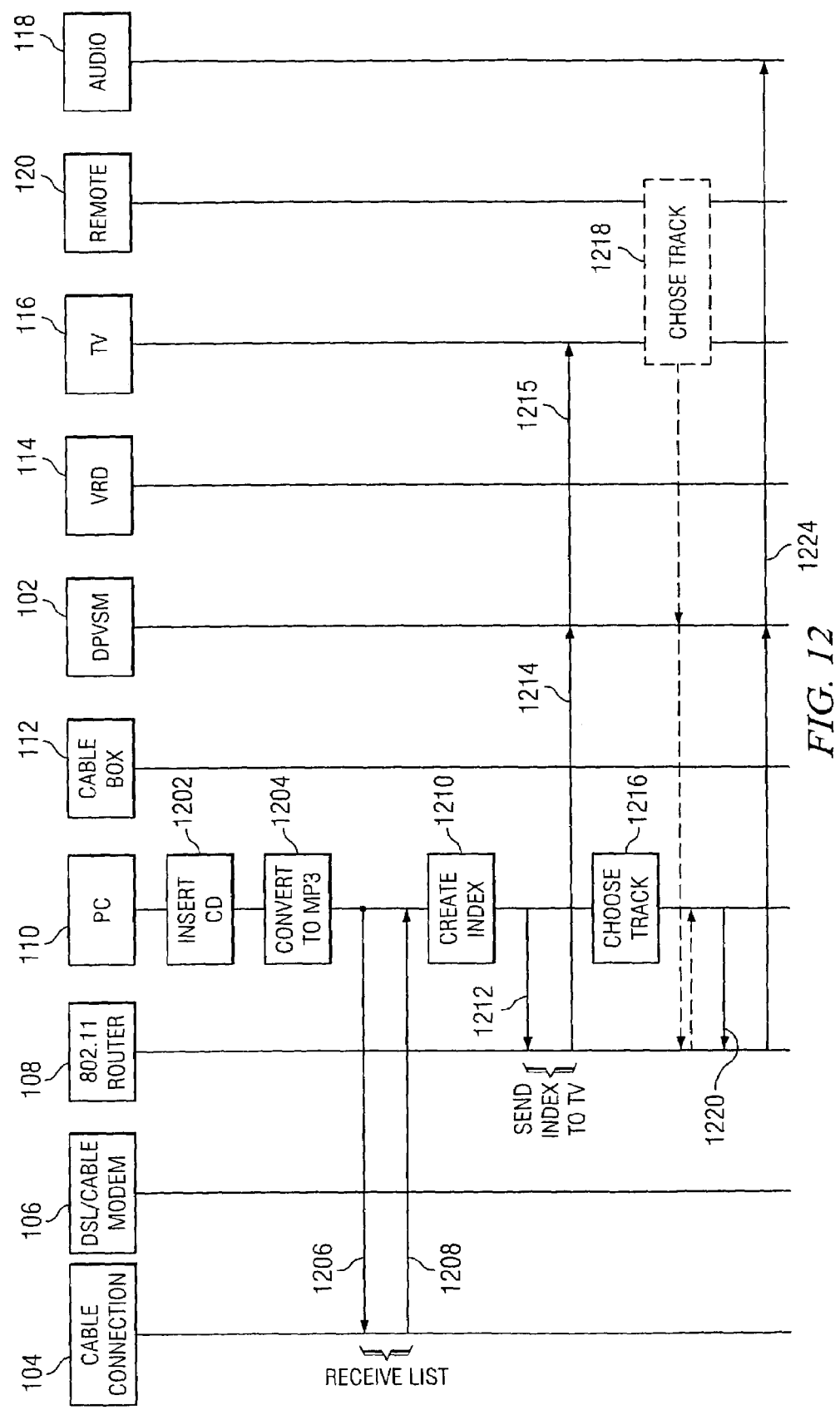
FIG. 12 is a signaling diagram illustrating operation of an embodiment of the present invention.

Operation of an embodiment of the present invention is shown in greater detail with reference to the signaling diagram of FIG. 12. Shown are the cable connection 104, DSL or cable modem 106, 802.11 router 108, personal computer 110, cable box 112, DPVSM 102, video recorder 114, television 116, and IR remote 120.

At 1202, the user can insert a compact disk into the CD or DVD player 900 of the personal computer 110. At 1204, the jukebox utility 900 on the personal computer 110 converts the file to a digital file format, such as an MP3 format. At 1206, the jukebox utility 900 uses the PC's web browser to access the Internet web site having the CD database and downloads it to the personal computer 110, at 1208. It is noted that the jukebox utility 900 may be implemented as one or more Web browser plug ins.

At 1210, the jukebox utility 900 creates an index or includes the current CD listing in an existing index. At 1216, the user can select a track or filename for playback. The selected file is then sent to the DPVSM 102 for playback via the router 108, at 1212 and 1214. The DPVSM 102 then plays the file on the audio system 118. Alternatively, the index could be sent to the DPVSM 102, which then generates a television based GUI, which can be selected using the IR remote 120, at 1218. The file can then be provided to the DPVSM 102 for playback, as discussed above.

It is noted that, while discussed above with reference to converting files from the CD in the personal computer 110's CD player, the CD tracks could also be converted using the DPVSM 102 with the initial playing occurring in the audio system 118, i.e., on a remote or media network disk player, coupled via the DPVSM 102 to the local area network. Such a system is generally similar to the system described above with reference to the video streams and thus is not duplicated here.

Wireless 802.11 Remote

The digital personal media stream manager (DPVSM) embodiments discussed above—both audio and video—are controllable via an infrared (IR) remote control. While inexpensive, such remote controls, however, depend on line-of-sight for functioning and thus are generally limited to a single room use. Accordingly, one aspect of the present invention is to provide an enhanced remote control for use in various rooms of a house or other space. In particular, as will be discussed in greater detail below, a wireless radio-signal remote control, such as a wireless local area remote, such as a wireless 802.11 remote, is provided, for control of DPVSM functionality. The wireless 802.11 remote control becomes an addressable device and can stay with the user throughout the house and used for control of network devices, such as the DPVSM 102 and attached devices. In addition, in certain embodiments, the handset can be provided with voice capabilities and can be used as a voice over IP handset (e.g., packet telephony or telephony over LAN functionality) or for voice-portal control of the DPVSM 102. Advantageously, the system of the present invention allows an Internet telephone call to be received by the user even if not present at the computer when the call arrives, by use of the remote, instead of missing the call or forwarding it to voice mail. Additionally, in certain embodiments, the remote 802.11 could also function as a personal digital assistant (PDA), allowing access to the user's personal computer files. Such an embodiment thus could run known PDA interfaces, software and/or operating systems.

Figure 13:
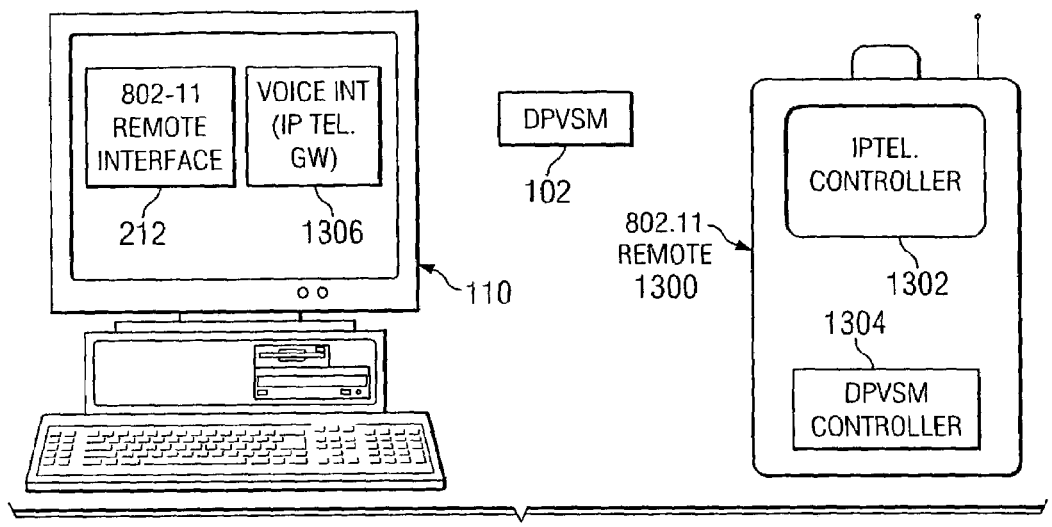
FIG. 13 is a diagram illustrating a wireless local area network remote control system according to an embodiment of the present invention.

Turning now to FIG. 13, a diagram of an exemplary system according to an embodiment of the present invention is shown. The system of FIG. 13 is generally similar to that of FIG. 1A and FIG. 1B. As such, only relevant components are shown. The system of FIG. 13 includes DPVSM 102, personal computer 110, and 802.11 remote 1300. The 802.11 remote 1300 includes an IP telephony controller 1302 and a DPVSM controller 1304, as will be explained in greater detail below. Similarly, the personal computer 110 includes an 802.11 wireless interface 212 and a VoIP interface engine 1306. The VoIP interface engine 1306 may function as an IP telephony gateway and may also itself support an IP telephony client. Thus, the VoIP interface 1306 may be embodied as an H.323 or SIP gateway.

Figure 14A:
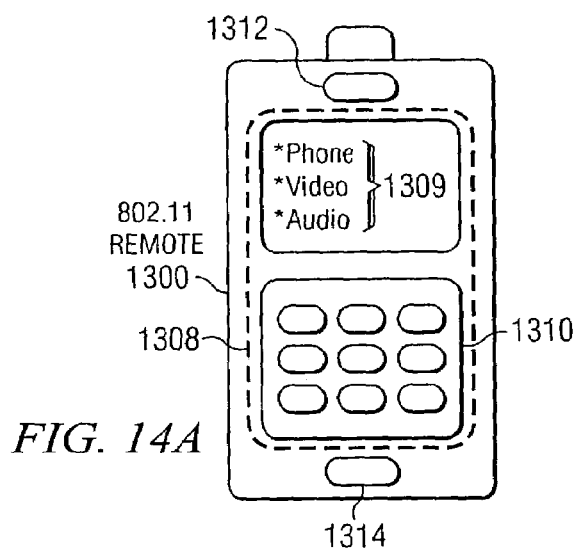
FIG. 14 is a diagram of a wireless local area network remote control system according to an embodiment of the present invention.
Figure 14B:
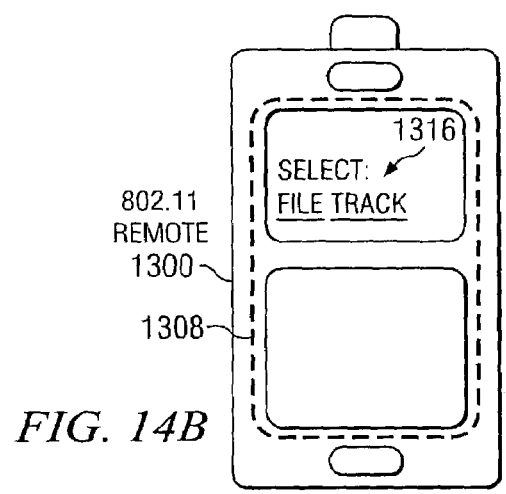

FIG. 14A and FIG. 14B illustrate an exemplary wireless remote according to an embodiment of the present invention. As shown, the remote 1300 includes a speaker 1312, a microphone 1314, and a display 1308. The display may be implemented as an LCD display. In the embodiment illustrated, the display 1308 is a touchpad display and thus functions as a "virtual" keypad; in other embodiments, a separate physical keypad and display may be provided. As shown in FIG. 14A, the display 1308 may be used to select a mode 1309, i.e., telephone, video, or audio control. If the user chooses the telephone mode, then the display shows a virtual telephone keypad 1310, which can be used to make and receive calls.

In the alternative, the user can select the audio or video modes. If the user selects audio or video mode, then a display generally similar to that discussed above for the personal computer control of the audio and video streams would be displayed. The 802.11 remote 1300 than functions as a network client in a manner similar to the personal computer 110.

If, for example, audio mode is selected, then as shown in FIG. 14B, the display 1308 shows a jukebox select screen 1316. The jukebox select screen 1316 can be used in a manner similar to that discussed above with reference to the audio stream manager. The wireless remote could also be used to download program schedules, media files, and the like, in a manner similar to that discussed above.

Figure 15:
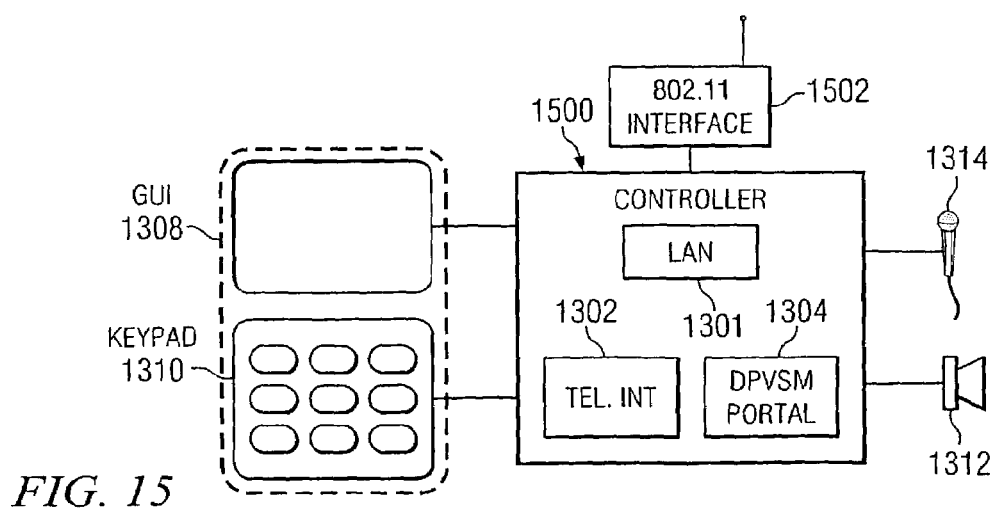
FIG. 15 is a block diagram of a wireless local area network remote control according to an embodiment of the present invention.

FIG. 15 is a block diagram illustrating an exemplary 802.11 remote control 1300 according to an embodiment of the present invention. As shown, the remote 1300 includes a control processor 1500, an 802.11 interface 1502, and a GUI display 1308 which may implement a telephony keypad 1310. The remote 1300 also includes a speaker 1312 and microphone 1314. The control processor 1500 implements a wireless LAN interface 1301, the telephony interface 1302, and the DPVSM controller 1304. As will be discussed in greater detail below, the wireless LAN interface 1301 provides access to the wireless LAN, and may implement the IEEE 802.11 standard. The telephony interface 1302 implements an IP telephone standard, such as H.323 or SIP. The DPVSM controller 1304 allows the remote 1300 to control the DPVSM 102 via the wireless LAN.

Figure 16:
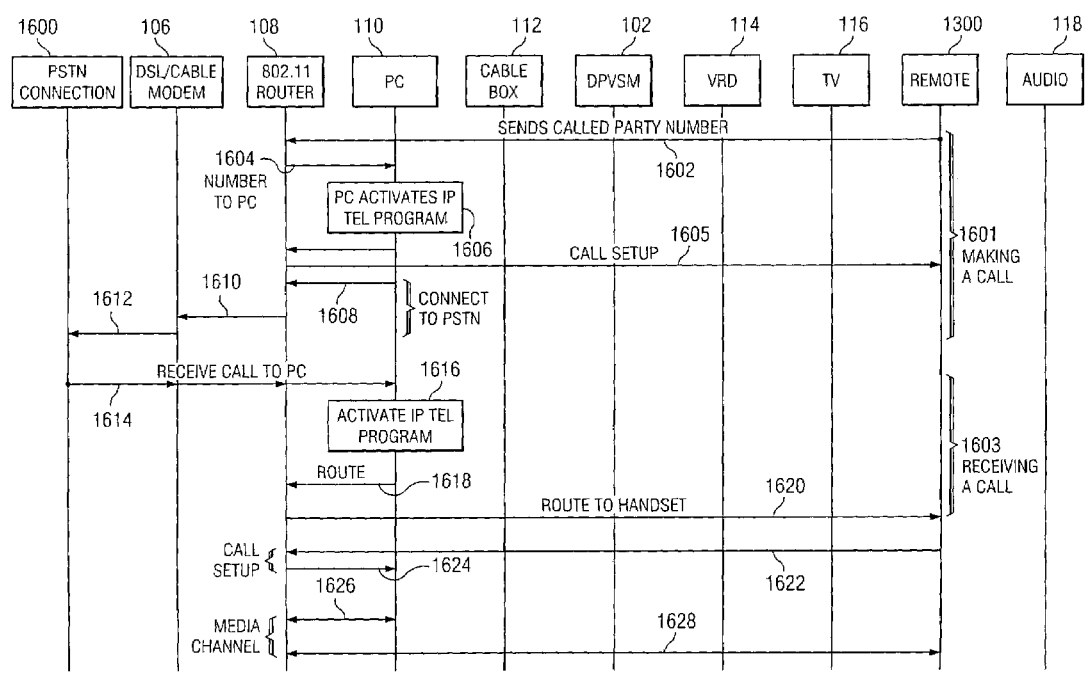
FIG. 16 is a signaling diagram illustrating operation of an embodiment of the present invention.
Figure 17:
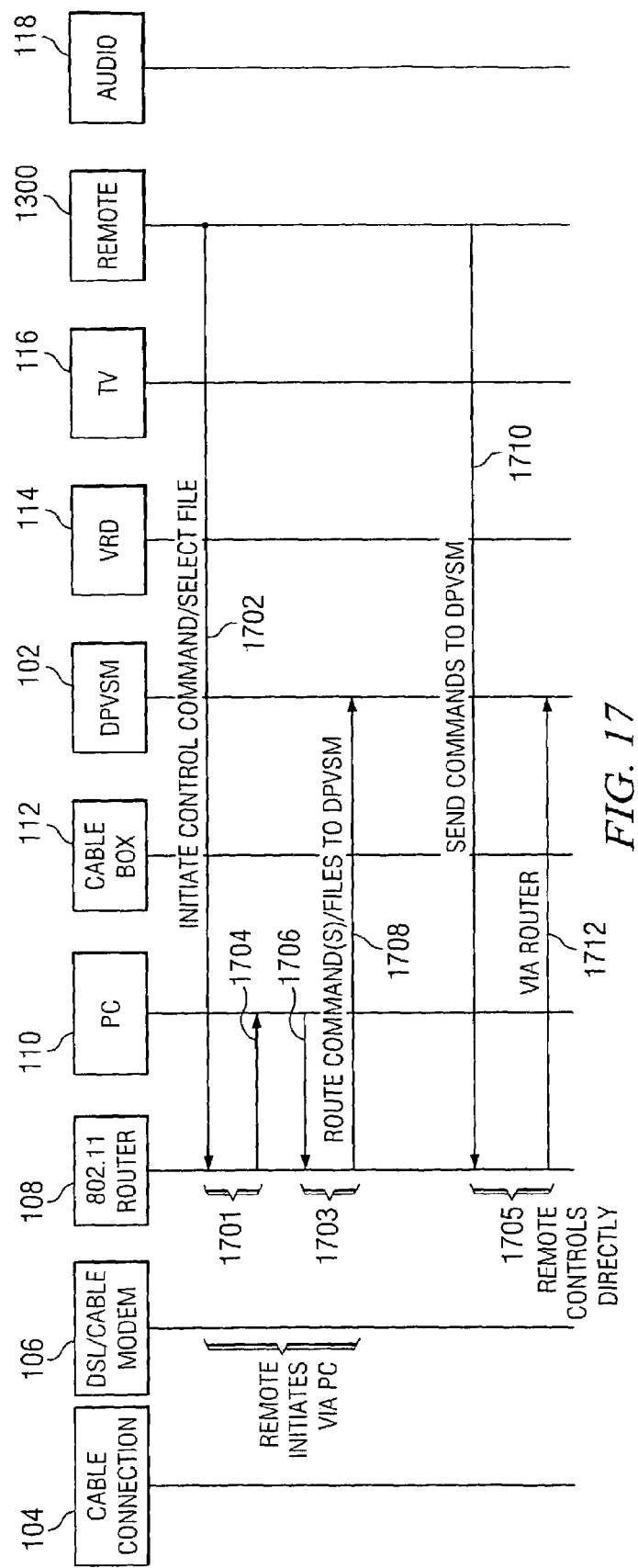
FIG. 17 is a signaling diagram illustrating operation of an embodiment of the present invention.

Operation of an embodiment of the 802.11 remote control is shown by way of the signaling diagram of FIG. 16. In particular, shown is use of the 802.11 remote control 1300 to make and receive a telephone call, at 1601 and 1603, respectively. Shown are a PSTN connection 1600, modem 106, 802.11 router 108, personal computer 110, cable box 112, DPVSM 102, video recorder 114, TV 116, and 802.11 remote 1300.

To make a phone call, the user of the 802.11 remote 1300 selects the telephone mode (FIG. 14) and dials the phone for the called party number. A call setup request message including a called party number is sent from the remote 1300 and, particularly, its telephony interface 1302, to the personal computer 110 via the 802.11 router 108, at 1602, 1604. As noted above, in certain embodiments, the IP telephone system is based on the Recommendation H.323 or Session Initiation Protocol, although other IP telephony standards can be employed. At 1606, the personal computer 110 activates its IP telephony program 1306. The personal computer 110 then undertakes its portion of call setup with the remote 1300 at 1605. When this is accomplished, the personal computer 110 attempts to complete the call with the outside network at 1608. In the embodiment illustrated, the personal computer 110 communicates via the router with the modem 106, at 1610, after making the necessary protocol conversions to use the outside network. Call setup is then done via connection 1600 and the external telephony provider at 1612. As is known, an external telephony provider can then either render the call on its end over the Public Switched Telephone Network or the Internet. The personal computer 110 then supervises the voice connection between the remote 1300 and the external connection 1600.

Call reception is handled similarly and is shown at 1603. At 1614, a call is received at the connection 1600, which is then routed via the modem and the router to the personal computer 110. The personal computer 110 activates its IP telephony program 1306 at 1616 and sends a call setup message to the remote 1300 via the router 108, at 1618, 1620. At 1622, 1624, the remote 1300 responds with its call setup response sequence. A media channel is then opened between the personal computer 110 and the remote 1300, at 1626, 1628; the personal computer 110 itself maintains the connection to the PSTN 1600.

As discussed above, the 802.11 remote 1300 can also be used to control the DPVSM 102 and, in particular, its video and audio handling capabilities, in a manner similar to that discussed above. Depending on the embodiment, such control can be exercised either through the personal computer 110 using its 802.11 remote interface (FIG. 1) or directly to and from the remote 1300 itself.

Control via the personal computer 110 is shown at 1701, 1703. At 1702, the user of the remote 1300 can select a program or audio file and transmit the choice to the personal computer 110 via the router 108, at 1704. The personal computer 110 then forwards commands or files to the DPVSM 102 via the router, at 1706, 1708. Broadband video and/or audio, as well as video and audio files would then be handled as discussed above in the "System Overview" section. It is noted that, in certain embodiments, actual audio and video files can be transmitted to the remote 1300 for display or playback, although resolution and fidelity might be less than on the television or personal computer system.

Because the remote 1300 also functions as a network client, in certain embodiments, the remote 1300 may be equipped with sufficient processing power and/or memory to directly control the DPVSM 102, without intervening support from the personal computer 110. Thus, as shown at 1705, the remote 1300 can communicate directly with the DPVSM 102 using its DPVSM control 1304 via the router 108 at 1710, 1712. Again, in such an embodiment, media streams and/or files would be handled similarly to the manner discussed above. In certain embodiments, of course, it may be necessary for communication to occur through the personal computer 110, which may maintain the media file database(s), as discussed above.

Electronic Messaging Control

In addition to providing local remote capabilities using the 802.11 remote or an IR remote, as discussed above, embodiments of the present invention also provide access to the DPVSM 102 from remote off-site locations. Discussion of such remote control is in the context of remotely programming a video recording device, it being understood that the techniques discussed herein are applicable to other specific remote control functions.

According to one embodiment of the present invention, an e-mail control capability is provided. In particular, in such an embodiment, the personal computer 110 and, specifically, the e-mail system may be provided with a DPVSM e-mail control module. The DPVSM e-mail control module is adapted to read a specially-formatted e-mail having a show, time and date identified. The DPVSM e-mail control module then sends one or more control messages via the local area network to the DPVSM 102, for recording. Such control commands may be in any format readable by the DPVSM.

A block diagram of an exemplary personal computer 110 employing the DPVSM control module is shown in FIG. 18. In particular, FIG. 18 shows personal computer 110 including an e-mail system or client 1802. The e-mail system 1802 may be embodied as any of a variety of known e-mail systems, such as Microsoft Outlook or Netscape Communicator. A DPVSM e-mail control module 1800 may be provided, according to embodiments of the present invention. The DPVSM e-mail control module may be embodied as a plug in for the e-mail program 1802. In particular, in certain embodiments, the DPVSM control program 312 may be provided with one or more APIs (application programming interfaces) to allow various control applications such as the DPVSM e-mail control program 1800. The DPVSM e-mail control program 1800 is adapted to read a special control e-mail and send one or more control commands to activate and control the DPVSM 102 in response. The DPVSM 102 can then control the recording of one or more shows, in a manner similar to that discussed above.

FIG. 19 is a diagram of an exemplary e-mail control message 1900 for use in conjunction with the DPVSM e-mail control program 1800 of FIG. 18. As shown, the e-mail control message 1900 includes a subject line 1902. The subject line 1902 includes an entry "Digital DPVSM," or other title that is read by the DPVSM e-mail control program 1800 to identify the associated message as a DPVSM control message. In the embodiment illustrated, the associated text of the message 1904 includes Date, Time, Channel, Duration, and Password entries. In certain embodiments, if security is an issue, standard encryption can be applied to encrypt the e-mail and protect the password. The Date, Time, Channel and Duration entries allow for unique selection of the program to be recorded. The Password entry allows the user to be uniquely identified, so that a third party cannot illicitly seize control of the DPVSM 102. Thus, in certain embodiments, the DPVSM e-mail control program 1800 maintains a password file in memory of the user and password. As will be discussed in greater detail below, the message is identified as a DPVSM control message, and the DPVSM 102 is programmed in response thereto.

This is illustrated with reference to the flowchart of FIG. 20. In particular, at step 2002, a user can compose a DPVSM e-mail control message 1900, either at the user's laptop computer or at a guest computer. At step 2004, the e-mail is received at the personal computer 110, by the personal computer's e-mail client 1802. The DPVSM e-mail control program 1800 reads the subject line and recognizes the message as referring to a DPVSM control message. At step 2008, the control parameters are converted to control parameters readable by the DPVSM 102. Finally, at 2010, the control parameters are then sent to the DPVSM 102, in step 2010. The DPVSM 102 then controls the video recorder 114.

Figure 21:
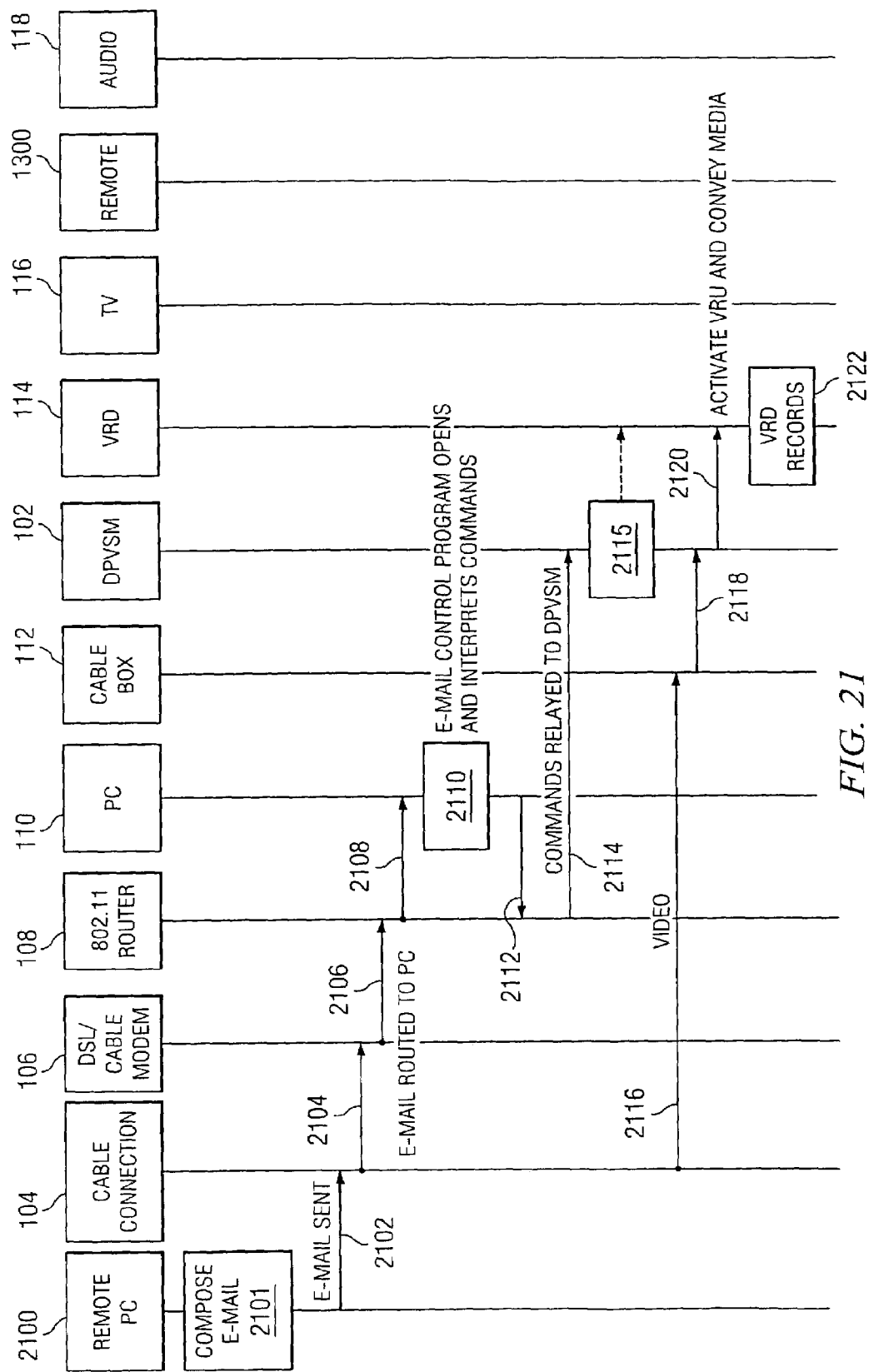
FIG. 21 is a signaling diagram illustrating operation of an embodiment of the present invention.

Signaling for such an embodiment is shown with reference to FIG. 21. Shown are a remote personal computer or laptop computer 2100, cable connection 104, modem 106, 802.11 router 108, personal computer 110, cable box 112, DPVSM 102, video recorder 114, and television 116. At 2101, the user composes the control e-mail at the remote computer 2100. At 2102, the e-mail control message 1900 arrives at the cable connection 104 and at the modem 106 at 2104. The modem 104 then conveys it to the 802.11 router, at 2106. The e-mail message 1900 is delivered to the personal computer 110 at 2108. At 2110, the personal computer's DPVSM e-mail control program 1800 reads the e-mail message header and identifies the message as being a DPVSM control message. In certain embodiments, the personal computer 110 may also send a confirmation to the user. The personal computer 110 and, particularly, the DPVSM controller 312, then sends the corresponding commands to the DPVSM 102 via the router 108 at 2112, 2114. At 2115, the DPVSM 102 is programmed to record the designated show at the specified time. At 2116, the broadband video is received via the cable connection 104 to the cable box 112, and to the DPVSM 102 at 2118. The DPVSM 102 then activates the video recorder 114 at 2120, in response to the programming from the e-mail control message. The video recorder 114 then records the program at 2122. Alternatively, at 2115, the DPVSM 102 could transmit the programming information to the video recording device 114 and program it then. When the media stream(s) arrive, the DPVSM 102 could then simply act as a conduit for the media stream rather than an active programming device.

Instant Messaging Control

According to another embodiment of the present invention, a user may remotely control the DPVSM system 100 by using a special DPVSM Instant Messaging control message. The user's home personal computer has an Instant Messaging client including a DPVSM IM Control module plug in, that recognizes the DPVSM Instant Messaging control message. The DPVSM control module plug in then sends a message with the program information to the DPVSM, which controls the programming of the video recorder.

Figure 22:
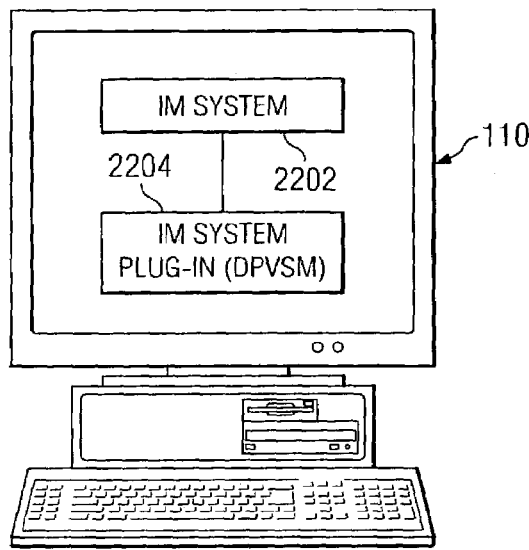
FIG. 22 is a block diagram of an instant messaging control system according to an embodiment of the present invention.

FIG. 22 illustrates an exemplary personal computer 110 including an Instant Messaging system or client 2202. The Instant Messaging system 2202 may be implemented as a known instant messaging system, such as Windows Instant Messenger or AOL Instant Messenger. Also shown is a DPVSM IM control module plug in 2204 according to embodiments of the present invention. The DPVSM IM control module plug in 2204 functions to read an IM control heading defining a message as a DPVSM control message; generate a confirmation; and translate the message into a DPVSM-readable control command, sent by the DPVSM controller 312 (FIG. 12) to the DPVSM 102. The DPVSM 102 then programs the video recorder to record the program at the designated time.

Figure 23:
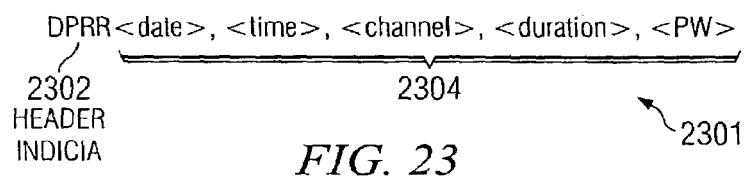
FIG. 23 illustrates an exemplary IM command according to an embodiment of the present invention.

FIG. 23 illustrates an exemplary IM control message according to this embodiment of the present invention. The message 2301 includes a header indicia 2302 and a message body 2304. The header indicia as shown is DPRR, though any other predetermined indicia could be used. The message body 2304 includes date, time, channel, duration, and a user password. As noted above, the DPVSM IM control module 2204 reads the message header 2302 and then knows to read the body of the message.

Figure 24:
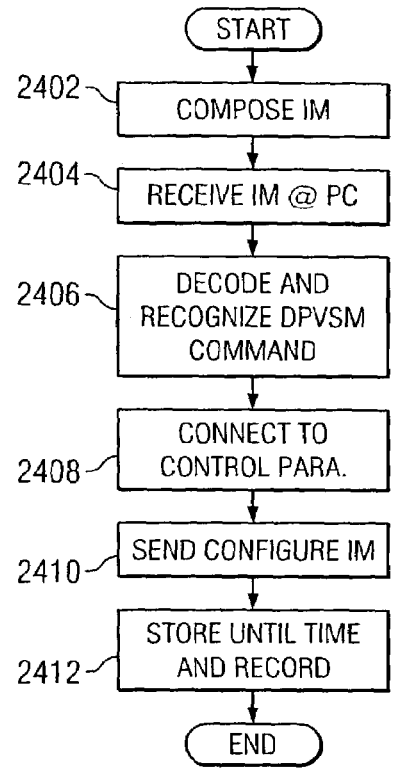
FIG. 24 is a flowchart illustrating operation of an embodiment of the present invention.

A flowchart illustrating operation of an embodiment of the present invention is shown in FIG. 24. At step 2402, the user can compose the IM control message 2301 at a remote location. At step 2404, the IM control message 2301 is transported in a standard manner to the personal computer 110. At step 2406, the IM client 2202 decodes the message and the DPVSM IM control module 2204 recognizes the message as referring to DPVSM control. At step 2408, the DPVSM IM control module 2204 converts the IM message into a control command format readable by the DPVSM 102. At step 2410, in certain embodiments, the DPVSM IM control module 2204 sends a confirmation message to the sender. This can identify the channel and other parameters and provide an indication that it has been received. Finally, at step 2412, the command is sent to the DPVSM 102 and stored until the time to execute the recording.

Figure 25:
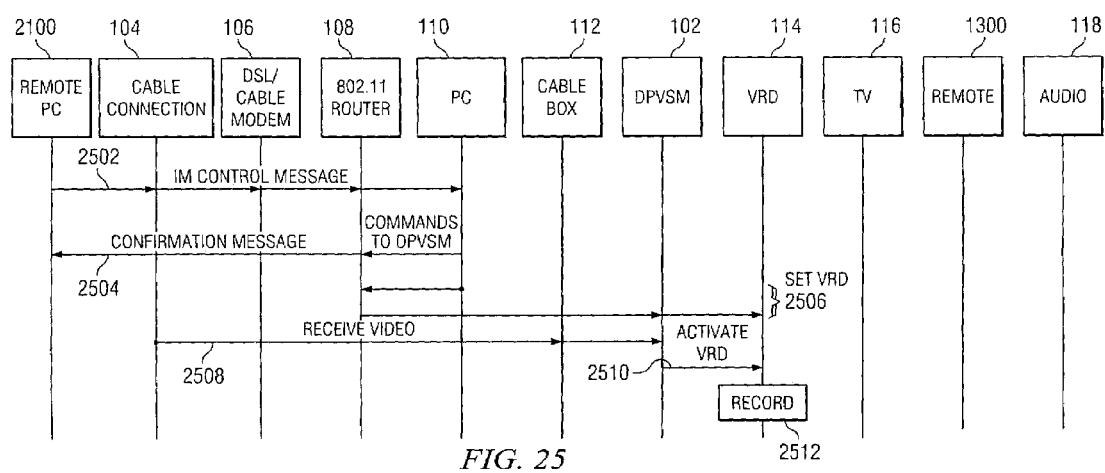
FIG. 25 is a signaling diagram illustrating operation of an embodiment of the present invention.

A signaling diagram showing operation of an embodiment of the present invention is shown in FIG. 25. Shown are a remote PC 2100, cable connection 104, modem 106, 802.11 router 108, personal computer 110, cable box 112, DPVSM 102, video recorder 114, and television 116. At 2502, the user at the remote PC 2100 composes a DPVSM IM control message, such as that discussed above. The IM provider then sends the message to the user's home personal computer 110, via the cable connection 104, modem 106 and router 108. At 2504, the personal computer 110's IM system and, particularly, the DPVSM IM control module 2204, sends a confirmation message back to the user at the remote PC 2100, once the DPVSM IM control message 2301 has been read. The DPVSM control module 312 of the personal computer 110 then sends one or more commands to the DPVSM 102 via the router 108, at 2506, with the appropriate programming instructions. These are then stored until the designated time; alternatively, the video recording device 114 can receive its programming instructions when they arrive at the DPVSM 102. The broadband video is received at the DPVSM 102 and video recorder 114, at 2508. At 2510, the video recorder 114 activates and at 2512, the video is recorded.

Short Message Service Control

According to another embodiment of the present invention, a Short Message Service (SMS) equipped telephone can be used to control the DPVSM 102. In particular, a SMS service provider may be adapted to detect a special SMS DPVSM control message and convert the SMS message to a form readable by the DPVSM client on the local personal computer. For example, such a control message may be implemented as an e-mail control message or even an IM control message, such as those discussed above. The control message is received by the personal computer 110 and then used by the DPVSM 102 to program the video recorder, in a manner similar to that discussed above.

FIG. 26 is a block diagram illustrating a system 2600 for enabling an SMS equipped telephone to program the DPVSM 102. In particular, the system 2600 shown in FIG. 26 includes a cellular telephone 2602 having SMS capabilities, a cell provider 2604, and DPVSM system 100. The DPVSM system 100 may be generally similar to those discussed above with reference to FIG. 1A and FIG. 1B.

The cell provider 2604 serves as the SMS service provider and maintains in conjunction with the SMS service, a DPVSM control detector 2606, DPVSM command generator 2608, and DPVSM name database 2610. The DPVSM control detector 2606 detects whether a received SMS message is a DPVSM control message, and accesses the DPVSM name database 2610 for the e-mail or IM address of the user. The DPVSM message converter 608 then converts the SMS DPVSM parameters in the message to a control message format readable by the personal computer 110, such as e-mail or IM. The DPVSM message converter 608 then sends the corresponding e-mail or IM message to the user's personal computer which decodes it and uses it to generate one or more control commands for control of the DPVSM 102, in a manner similar to that discussed above with reference to E-Mail and IM Control.

An exemplary SMS message for DPVSM control is shown in FIG. 27. The SMS message 2700 is generally similar to those discussed above with reference to the e-mail and IM embodiments. Thus, the SMS message 2700 includes a DPVSM identifying header; date; time; duration; channel; and password parameters.

As noted above, the SMS DPVSM control message 2700 is received by the DPVSM detector 2606 which then accesses the DPVSM names database 2610. The DPVSM names database 2610 includes entries corresponding to users' cell phone numbers and e-mail or IM user name, as shown in the exemplary database entry 2800 of FIG. 28.

The entries in the DPVSM names database 2610 could be set by a system administrator or other administrative entity. According to a particular embodiment, the DPVSM names database entries 2800 are set by users via the World Wide Web or Internet access. For example, as shown in FIG. 29, the SMS/Cell provider maintains a web server 2900 in conjunction with the SMS server 2604. The web server 2900 maintains a web page interface 2904 that allows the user to log in and make the DPVSM names database entries using standard form-making script 2902. The entries can then be provided to the SMS server 2604. It is noted that, in certain embodiments, the SMS server and the web server may be the same instrument. Thus, the figure is exemplary only.

FIG. 30 is a flowchart illustrating database entry according to an embodiment of the present invention. In step 3002, the user can log in to the cell or SMS service provider's web site 2900. Log in can include, for example, the user registering and providing a personal identification number, for example. The user can then enter the user's cell phone number, user ID, and e-mail or IM name, in step 3004. Finally, at step 3006, the entry is provided to the database 2610 at the SMS server 2604.

FIG. 31 is a flowchart illustrating operation of use of SMS messaging to control the DPVSM 102 according to an embodiment of the present invention. At step 3102, the user can compose an SMS DPVSM control message 2700 using his cell phone. As discussed above, such a message 2700 typically includes a DPVSM identifier, a password, and time, duration and channel information. At step 3104, the SMS DPVSM control message 2700 is sent to the SMS server 2604. The SMS server 2604 recognizes the message as relating to DPVSM control by its header, at step 3106. The DPVSM detector 2606 then accesses the DPVSM database 2610 for the caller's e-mail (or IM) address; the DPVSM detector can identify the user's telephone number by standard calling number identification techniques. Once the e-mail address (or IM) is recognized, at step 3110, the DPVSM message converter 2608 converts the SMS control message to a control message. This message is sent to the messaging client at the user's PC 110, at step 3112. Finally, in step 3114, the user's PC and, particularly, an e-mail DPVSM control unit or an IM DPVSM control unit, such as those described above, processes the message to generate one or more control commands. The DPVSM 102 can then control the programming of the video recorder as discussed above.

Voice Portal Control

According to another embodiment of the present invention, a voice portal control is provided to control the programming of the DPVSM. More particularly, in such an embodiment, a user can simply respond to one or more interactive voice response queries to program the DPVSM. Such a voice portal may be used by a party calling in on a standard telephone, or through use of the networked wireless 802.11 remote control discussed above.

For example FIG. 32 illustrates an exemplary user interaction with a voice portal for controlling a DPVSM 102 according to embodiments of the present invention. At 3250, after the user calls in or otherwise logs in, the voice portal responds "Welcome to your DPVSM." Next, the voice portal prompts to the user to "Enter your password," at 3252. Once the user does so, and the password is confirmed, the user is requested, at 3254, to speak or enter a date, time, channel and duration of recording. Once the user makes the appropriate entries, as will be discussed in greater detail below, the voice portal server contacts the DPVSM system 100 to cause the video recorder 114 to record the designated program. In particular, as will be discussed in greater detail below, once the voice entries have been made, the voice portal server converts the entries into a DPVSM system readable message, such as an email or an IM message, and then sends it to the user's PC. The user's PC 110 accepts the message and instructs the DPVSM 102 accordingly. The voice portal may be implemented to respond to voice commands through known voice recognition techniques, or to keypad input, such as via DTMF tone recognition.

Figure 33B:
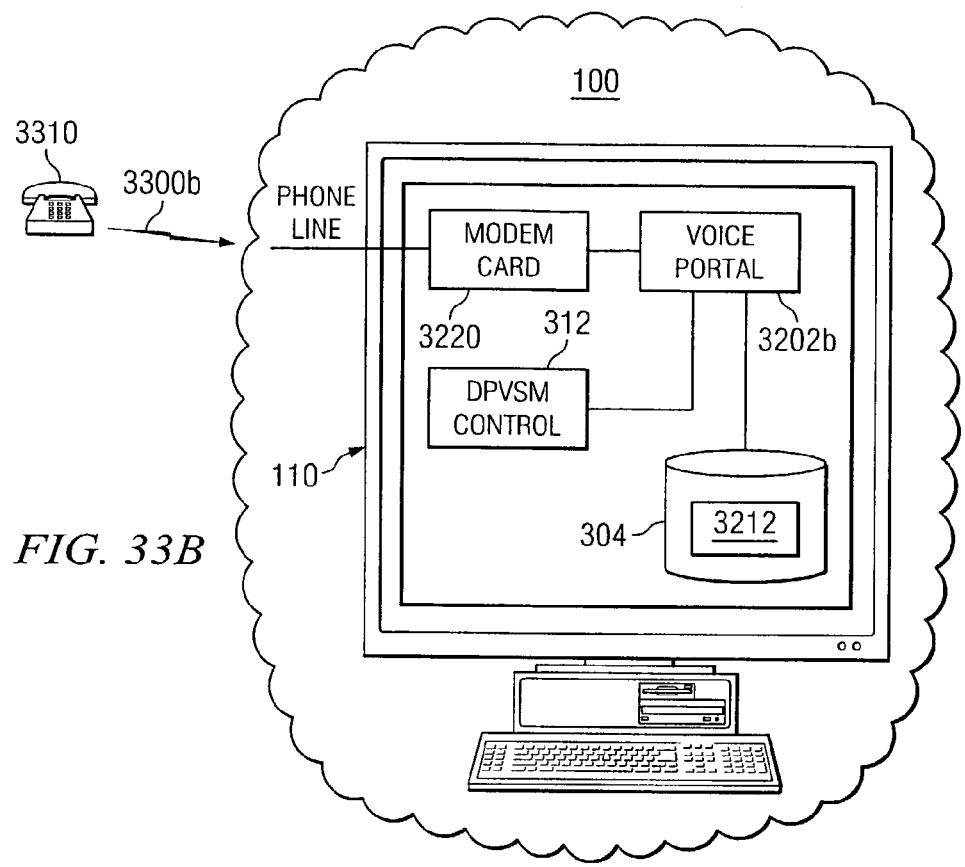

FIG. 33A illustrates an exemplary voice portal DPVSM control system 3300a according to an embodiment of the present invention. As shown, the system 3300a of FIG. 33A includes a voice portal server 3202a having a voice portal 3304, a voice-to-email (or IM) converter 3306 and a database 3308. The voice portal server 3202a operably couples via e-mail or IM messaging to the DPVSM system 100.

According to a particular embodiment, the DPVSM names 3308 database entries are set by users via the World Wide Web or Internet access.

Figure 34:
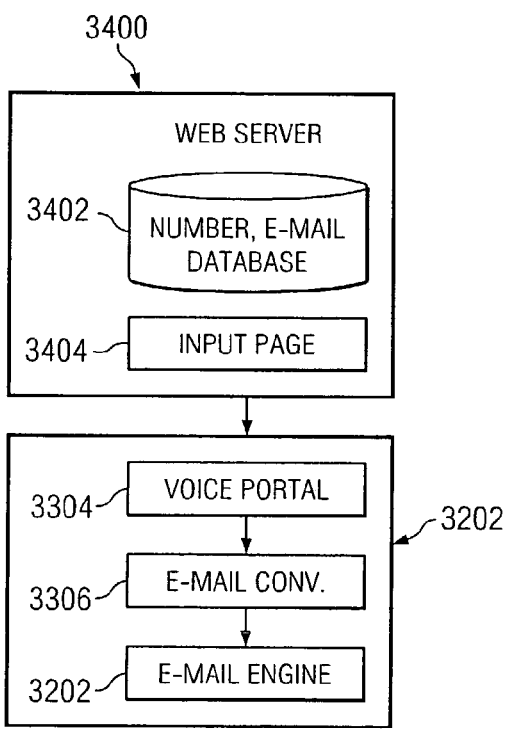
FIG. 34 is a diagram of a telecommunications system according to an embodiment of the present invention.

For example, as shown in FIG. 34, generally similar to the SMS server of FIG. 29, the voice portal provider maintains a web server 3400 in conjunction with the voice portal server 3202a. The web server 3400 maintains a web page interface 3404 that allows the user to log in and make the DPVSM names database entries 3402. The entries could be made using standard form-making script, for example. The entries can then be provided to the voice portal server 3202. Actual entries may be similar to those of FIG. 30.

Figure 35:
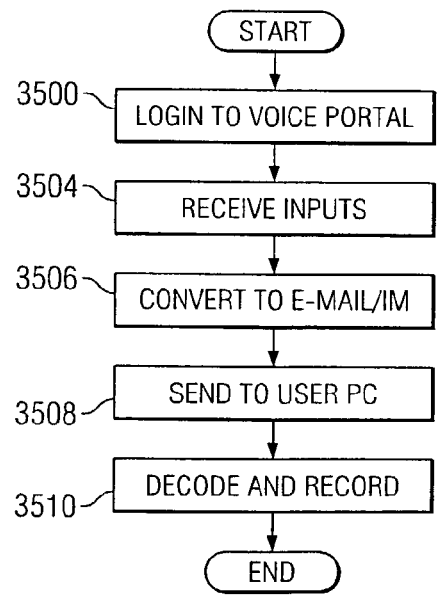
FIG. 35 is a flowchart illustrating operation of an embodiment of the present invention.

In operation, as shown in FIG. 35, the user of telephone 3310, which may be a cell phone or a remote landline telephone, calls in at the voice portal server 3202a in step 3500. The voice portal server 3202a may be provided, for example, by a service provider and the number dialed may be a 900 or 800 (toll free) number. The calling party can be identified by either a calling party identification technique, or by the spoken password, or a combination thereof. The voice portal control 3304 provides the interactive voice response control described above with reference to FIG. 32, in step 3504. That is, the user inputs the desired program recording information. The database 3308 provides a corresponding e-mail address or IM user name. In step 3506, the converter 3306 converts the user inputs from the voice or IVR response inputs into the associated e-mail or IM messaging control message, such as the email or IM control message discussed above. These messages are provided to the user's home personal computer 110 and, particularly, read by the PC's DPVSM control system 312, in step 3508. Finally, the personal computer 110 sends control commands to the DPVSM 102 itself, in step 3510, which programs the video recorder 114 in response thereto.

In the voice portal embodiment discussed above, the voice portal engine is implemented by a service provider at a remote server. In other embodiments, such a voice portal may be provided at the user's personal computer 110 itself. A block diagram of such an embodiment is shown in FIG. 32B. More particularly, FIG. 32B illustrates telephone 3310 and a portion of the DPVSM telecommunications system 100. Shown is a block diagram of a personal computer 110 including voice portal 3202b. The voice portal 3202b couples to the DPVSM control 312 and to a memory 304 for storing voice portal information. In particular, the memory 304 stores one or more files 3212 of voice parameters for the system commands of FIG. 32 and files that allow conversion between voice portal inputs and DPVSM recognizable commands. In certain embodiments, the voice portal may be a submodule of the DPVSM control 312. The voice portal 3202b couples via a modem card 3220 to the PSTN (not shown). The voice portal 3202b may be implemented using known voice recognition technology.

Figure 36:
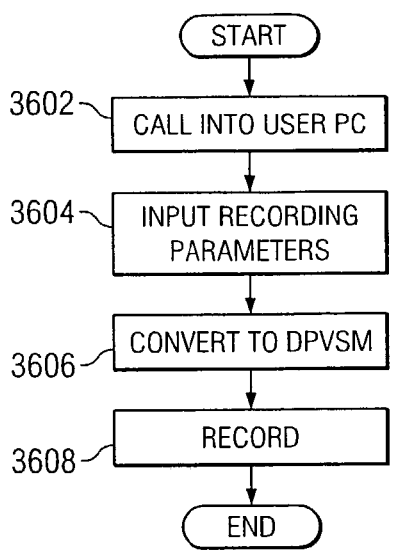
FIG. 36 is a flowchart illustrating operation of an embodiment of the present invention.

Operation of this embodiment of the present invention is shown with reference to the flowchart of FIG. 36. At step 3602, the user calls in from the telephone 3310 to his personal computer 110. As noted above, the call is to the user's home telephone number; the call is received via modem 3220, which is coupled to the phone line. At step 3604, the voice portal 3202b generates the voice prompts to allow the user to input the programming information, which is then received by the voice portal 3202b. In response, in step 3606, the voice portal 3202b accesses the database 3212 to convert the received inputs into control commands readable by the DPVSM 102. Finally, at step 3608, the DPVSM control 312 causes the commands to be transmitted to the DPVSM 102 (FIG. 1) itself. The DPVSM 102 then controls the video recorder 114 for the recording of the program.

It is noted that in the voice portal embodiments discussed above, the user can speak the actual program name and related information. In other embodiments, however, the voice portal system could maintain a database of programs and show times, each having a unique numerical identifier. The user could then log in to a web site to determine the particular show's identifier, then dial in to the voice portal and input the identifier, either by speaking or by DTMF or other keyed input.

Context-Based Search System

The above-described embodiments for remote control of the DPVSM 102 and program recording generally assume that the user has an idea of what channel and time the show occurs. It may, however, be the case that the user has only a general idea of the time, date and channel a show is on. This may particularly be the case if the show is a one time sporting event. A context-based search system according to embodiments of the present invention allows a user to control his DVPSM remotely, even when not immediately possessed of complete programming information.

Figure 37:
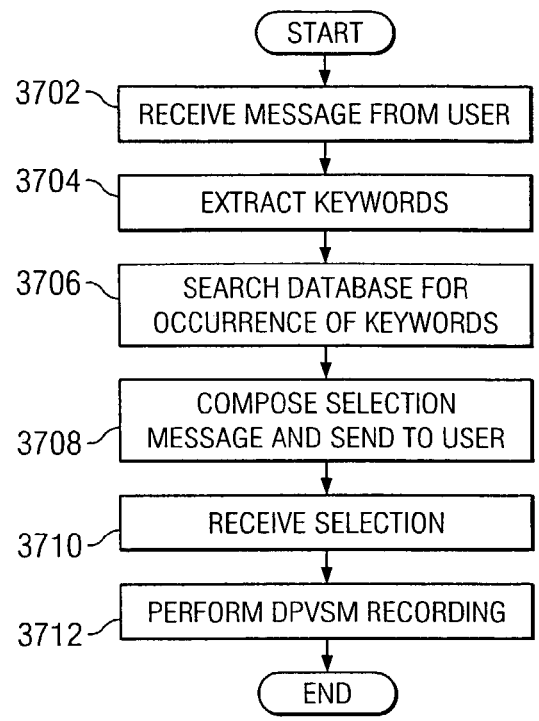
FIG. 37 is a flowchart illustrating operation of an embodiment of the present invention.

Operation of such an embodiment of the present invention is shown more particularly with reference to FIG. 37. In a step 3702, a user composes a DPVSM control message, such as an e-mail, IM, or SMS message, or logs in to a voice portal, such as described above. At step 3704, the search system extracts keywords from the message or other inputs. For example, the search system could maintain a database of keywords such as "football," "boxing," or program titles and network, or approximate dates or ranges of dates. Next, at a step 3706, the search system searches a program database for occurrences of the keywords. If found, the search system composes a selection message, identifying programs in which the keywords are found, and sends it to the user. At a step 3710, the user can receive the message and make the selection. In one embodiment, each choice may be provided with a one or two digit identifier. When this is received back, the DPVSM recording may occur.

Figure 38:
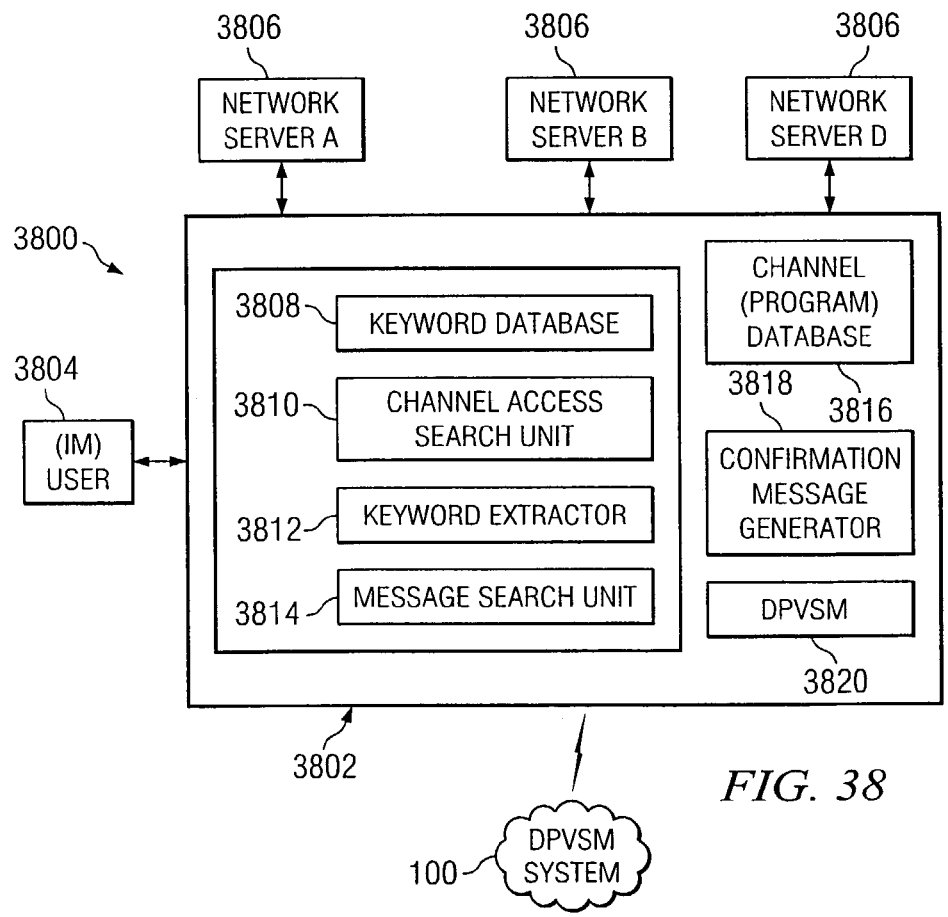
FIG. 38 is a diagram of a telecommunications system according to an embodiment of the present invention.

An exemplary DPVSM context-based search system according to embodiments of the preset invention is shown in FIG. 38. The system 3800 includes DPVSM system 100, server 3802, remote user 3804, and one or more network servers 3806a-3806n. The DPVSM system 100 may be generally similar to that discussed above. The network servers 3806a-3806n provide programming information to the server 3802 databases, as will be explained in greater detail below.

The search server 3802 includes a message receiver 3902, a keyword database 3808, a program database 3816, a channel access search unit 3810, a keyword extractor 3812, a message search unit 3814, a confirmation message generator 3818, and a DPVSM message generator 3820. The message receiver 3902 receives the user's control message; the user 3804 may employ any of the above-described remote access methods to access the search system 3802.

As will be explained in greater detail below, the keyword database 3808 maintains a listing of program keywords that can be extracted from the incoming user message. The keyword extractor 3812 receives the incoming message, accesses the keyword database 3808 and extracts any keywords from the message. The message search unit 3814 uses the extracted keyword(s) to search the program database 3816, which is the listing of program times and scheduling. The program database 3816 may be programmed via the channel access search unit 3810, which accesses the network servers 3806 for programming information. The confirmation message generator 3818 generates a confirmation or selection message which is sent to the user once the program database has been searched. The DPVSM controller 312 then receives the user's selection and sends control messages to the DPVSM system 100. The DPVSM system can then convert the control message to one or more control commands for causing the DPVSM 102 to program the video recording device.

Figure 39:
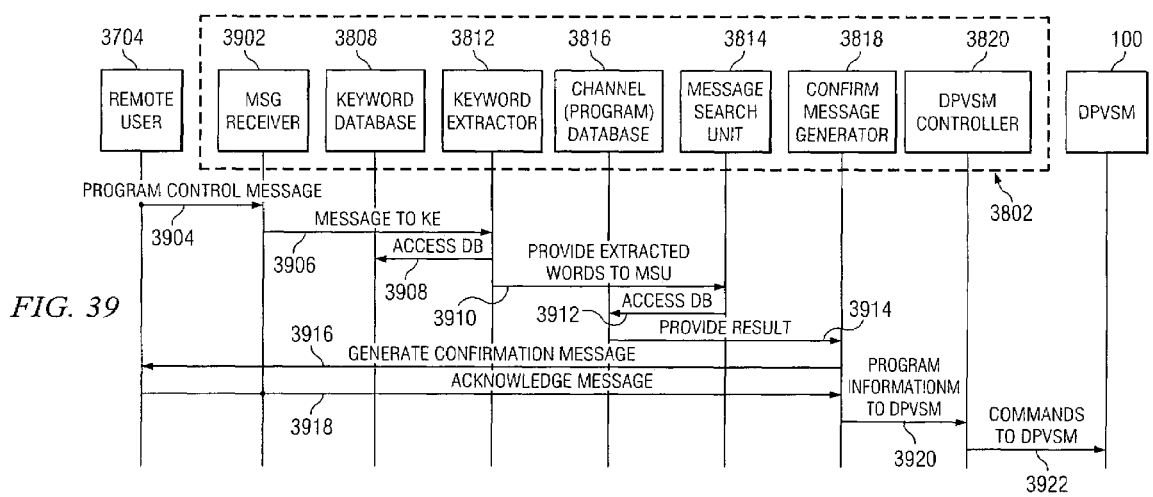
FIG. 39 is a signaling diagram illustrating operation of an embodiment of the present invention.

Operation of an embodiment of the present invention is illustrated more particularly with reference to the signaling diagram of FIG. 39. Shown is the search system 3802, a remote user 3804, and the DPVSM system 100.

At 3904, the user's programming control message is sent to the search system 3802. In particular, a message receiver 3902 receives the incoming message from the user. The message may be in a Short Message Service format, an Instant Messaging format, an e-mail format, or a voice portal format. The message receiver sends the message to the keyword extractor 3812, at 3906. The keyword extractor 3812 accesses the keyword database 3808, at 3908. The extracted keywords are provided to the message search unit 3814, at 3910. At 3912, the message search unit 3814 accesses the program database 3816. The results, if any, are then provided to the confirmation message generator 3818, at 3914. The confirmation message generator 3818 then, at 3916, generates a message including search matches in the appropriate received format. Thus, for example, if the message was an IM message, the confirmation message will likewise be an IM message. The user can then make a selection of the appropriate program and return an acknowledge message, at 3918. The DPVSM controller 3820 then receives the program information at 3920. Finally, the DPVSM controller 3820 sends one or more control messages, such as the e-mail or IM control messages discussed above, to the DPVSM system 100, at 3922. Typically, the message is received by the user's PC 110, which generates one or more control commands, and handling proceeds in a manner similar to that discussed above.

Figure 40:
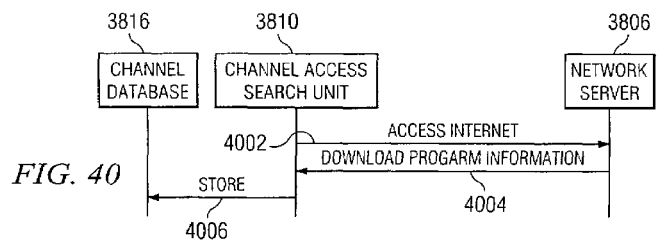
FIG. 40 is a signaling diagram illustrating operation of an embodiment of the present invention.

As noted above, the search system 3802 can access one or more network servers 3806 to determine programming schedules. This is illustrated in FIG. 40. Shown are the channel access search unit 3810 and the program database 3816, as well as an exemplary network server 3806. The channel access search unit may be an automated Internet browser plug in that periodically accesses the network server 3806, at 4002. The information is received at 4004 and provided to the channel database 3816 at 4006. Any formatting changes, if necessary, can be made by the channel access search unit 3816.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, characterized by:
a local area network including a network router;
a digital personal media stream manager operably coupled to said local area network;
an audio system operably coupled to said digital personal media stream manager;
a computer operably coupled to said local area network and having a digital personal media stream manager controller and a memory for storing media files from one or more media disks and adapted to transmit said media files to said digital personal media stream manager; and
an Internet access device operably coupled to said local area network and said computer;
wherein said digital personal media stream manager is adapted to convert said media files to a format that said audio system can play back;
wherein the digital personal media stream manager is configured to interface the computer with the audio system such that audio files stored by the computer on the memory can be played back via the audio system.

2. A telecommunications system in accordance with claim 1, wherein said computer is adapted to access said Internet via said Internet access device and download one or more playlists associated with said media disks and create an index based on said playlists.

3. A telecommunications system in accordance with claim 2, wherein said digital personal media stream manager is adapted to access said index via a television-based interface.

4. A telecommunications system in accordance with claim 1, wherein said computer includes a local media disk player and is adapted to copy media files from a disk in said local media disk player.

5. A telecommunications system in accordance with claim 1, further including a network media disk player operably coupled to said local area network and wherein said computer is adapted to copy media files from a disk in said network media disk player via said local area network.

6. A telecommunications system in accordance with claim 1, wherein said computer is configured to download one or more media files from said Internet and transmit said one or mare media files over said local area network to said digital personal media stream manager for playback on said audio system.

7. A telecommunications system in accordance with claim 1, wherein said local area network is a wireless local area network.

8. A telecommunications method, comprising:
copying one or more tracks of a media disk to be stored as one or more digital files in a memory of a computer on a local area network;
downloading one or more playlists associated with said one or more media disks from an Internet;
organizing said playlists into a master index;
using a digital personal media stream manager to access said master index via a television-based interface; and
transmitting a selected entry in said master index to said digital personal media stream manager for playback via an audio system coupled to the digital personal media stream manager.

9. A telecommunications method in accordance with claim 8, wherein said copying comprises copying from a disk at said audio system and via said local area network.

10. A telecommunications method in accordance with claim 8, wherein said copying comprises copying a disk locally at said computer.

11. A telecommunications method in accordance with claim 8, further comprising accessing said master index locally at said computer and transmitting a selected entry in said master index for playback to said digital personal media stream manager via said audio system.

12. A telecommunications method in accordance with claim 8, wherein said local area network is a wireless local area network.

* * * * *